(12) United States Patent
Cai et al.

(10) Patent No.: US 10,851,999 B2
(45) Date of Patent: Dec. 1, 2020

(54) FUEL INJECTORS AND METHODS OF USE IN GAS TURBINE COMBUSTOR

(71) Applicant: General Electric Company, Schenectady, NY (US)

(72) Inventors: Jun Cai, Greer, SC (US); Andrew Grady Godfrey, Simpsonville, SC (US); Richard Martin DiCintio, Simpsonville, SC (US); Seth Reynolds Hoffman, Spartanburg, SC (US); Ronnie Ray Pentecost, Travelers Rest, SC (US); Jayaprakash Natarajan, Greer, SC (US); Wei Zhao, Greer, SC (US)

(73) Assignee: General Electric Company, Schenectady, NY (US)

( * ) Notice: Subject to any disclaimer, the term of this patent is extended or adjusted under 35 U.S.C. 154(b) by 392 days.

(21) Appl. No.: 15/728,009

(22) Filed: Oct. 9, 2017

(65) Prior Publication Data

US 2018/0187894 A1 Jul. 5, 2018

Related U.S. Application Data

(63) Continuation-in-part of application No. 15/395,314, filed on Dec. 30, 2016.

(51) Int. Cl.
*F23R 3/34* (2006.01)
*F23R 3/00* (2006.01)
*F23D 14/64* (2006.01)
*F23R 3/28* (2006.01)
*F23R 3/12* (2006.01)
*F02C 3/04* (2006.01)

(52) U.S. Cl.
CPC .............. *F23R 3/346* (2013.01); *F23D 14/64* (2013.01); *F23R 3/002* (2013.01); *F23R 3/12* (2013.01); *F23R 3/286* (2013.01); *F02C 3/04* (2013.01); *F05D 2240/35* (2013.01)

(58) Field of Classification Search
CPC ................ F23R 3/12; F23R 3/34; F23R 3/346
See application file for complete search history.

(56) References Cited

U.S. PATENT DOCUMENTS

| 4,903,480 | A | 2/1990 | Lee et al. |
| 5,220,787 | A | 6/1993 | Bulman |
| 5,640,851 | A | 6/1997 | Toon et al. |
| 6,915,636 | B2 | 7/2005 | Stuttaford et al. |
| 7,878,000 | B2 | 2/2011 | Mancini et al. |

(Continued)

*Primary Examiner* — Todd E Manahan
*Assistant Examiner* — Thuyhang N Nguyen
(74) *Attorney, Agent, or Firm* — Armstrong Teasdale LLP

(57) ABSTRACT

A fuel injector is provided for the radial introduction of a fuel/air mixture to a combustor. The fuel injector includes a frame having interior sides defining an opening for passage of a first fluid; at least one fuel injection body; and a conduit fitting. The at least one fuel injection body is coupled to the frame and positioned within the opening, thereby defining flow paths for the first fluid. The at least one fuel injection body defines a fuel plenum, and a set of fuel injection holes are defined through an outer surface of the at least one fuel injection body. The conduit fitting is coupled to the frame and conveys fuel from a fuel supply line to the fuel plenum. Fuel and the first fluid mix in the flow paths and are delivered through the outlet to the combustor.

20 Claims, 15 Drawing Sheets

(56) References Cited

U.S. PATENT DOCUMENTS

| | | |
|---|---|---|
| 8,113,001 B2 | 2/2012 | Singh et al. |
| 8,171,735 B2 | 5/2012 | Mancini et al. |
| 8,387,391 B2 | 3/2013 | Patel et al. |
| 8,438,856 B2 | 5/2013 | Chila et al. |
| 8,590,311 B2 | 11/2013 | Parsania et al. |
| 8,745,987 B2 | 6/2014 | Stoia et al. |
| 8,863,525 B2 | 10/2014 | Toronto et al. |
| 8,943,831 B2 * | 2/2015 | Eroglu .................... F23R 3/36 239/422 |
| 9,267,436 B2 | 2/2016 | Stoia et al. |
| 9,291,350 B2 | 3/2016 | Melton et al. |
| 9,303,872 B2 | 4/2016 | Hadley et al. |
| 9,316,155 B2 | 4/2016 | DiCintio et al. |
| 9,316,396 B2 | 4/2016 | DiCintio et al. |
| 9,322,556 B2 | 4/2016 | Melton et al. |
| 9,360,217 B2 | 6/2016 | DiCintio et al. |
| 9,376,961 B2 | 6/2016 | Stoia et al. |
| 9,383,104 B2 | 7/2016 | Melton et al. |
| 9,400,114 B2 | 7/2016 | Melton et al. |
| 2012/0272659 A1 * | 11/2012 | Syed .................... F23R 3/12 60/791 |
| 2013/0067921 A1 * | 3/2013 | Hadley .................. F23R 3/346 60/746 |
| 2014/0260280 A1 | 9/2014 | Willis et al. |
| 2014/0260318 A1 | 9/2014 | Willis et al. |
| 2014/0360193 A1 | 12/2014 | Stoia et al. |

* cited by examiner

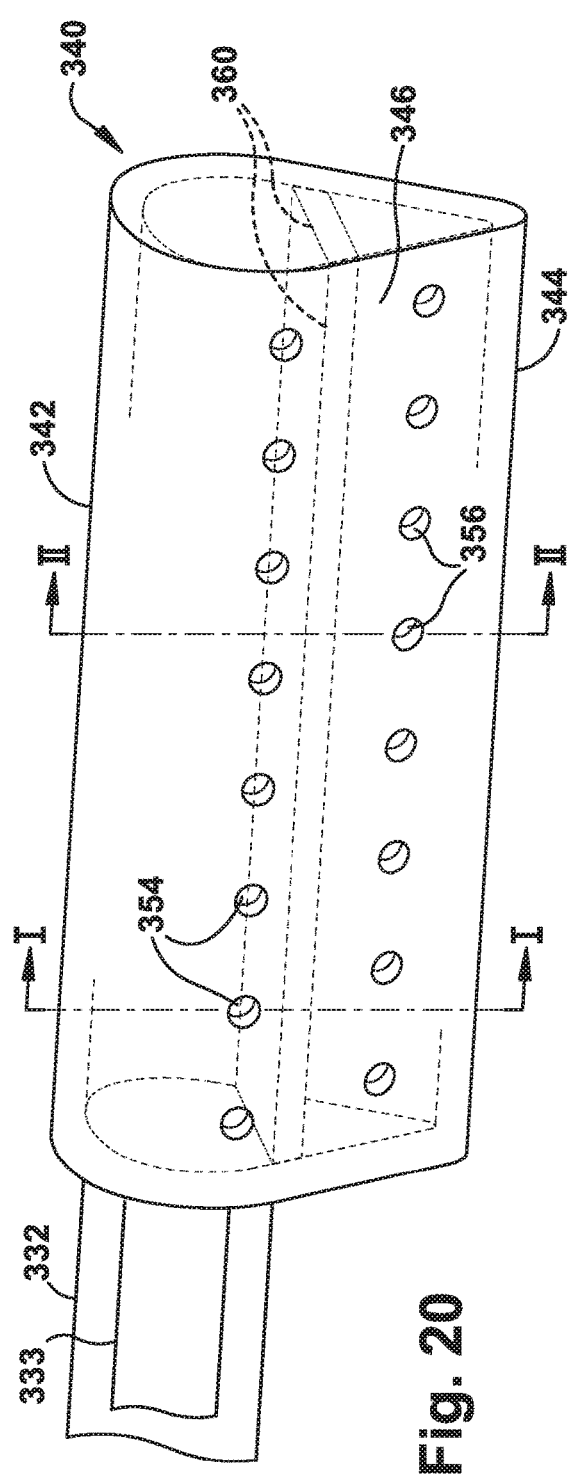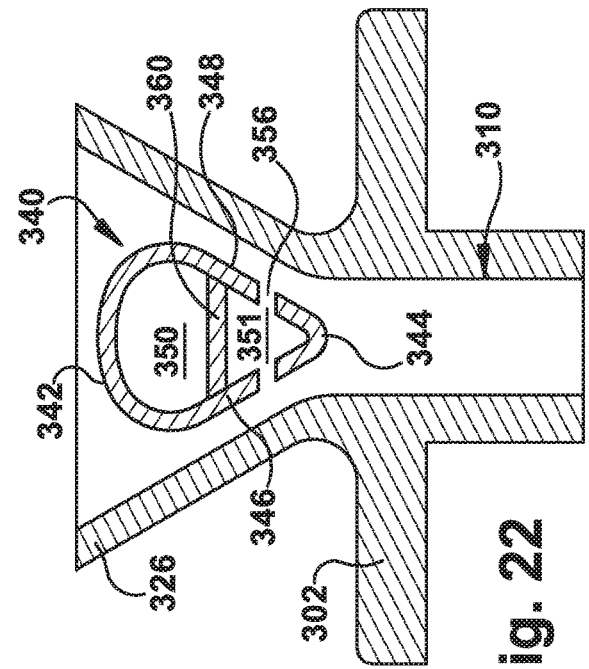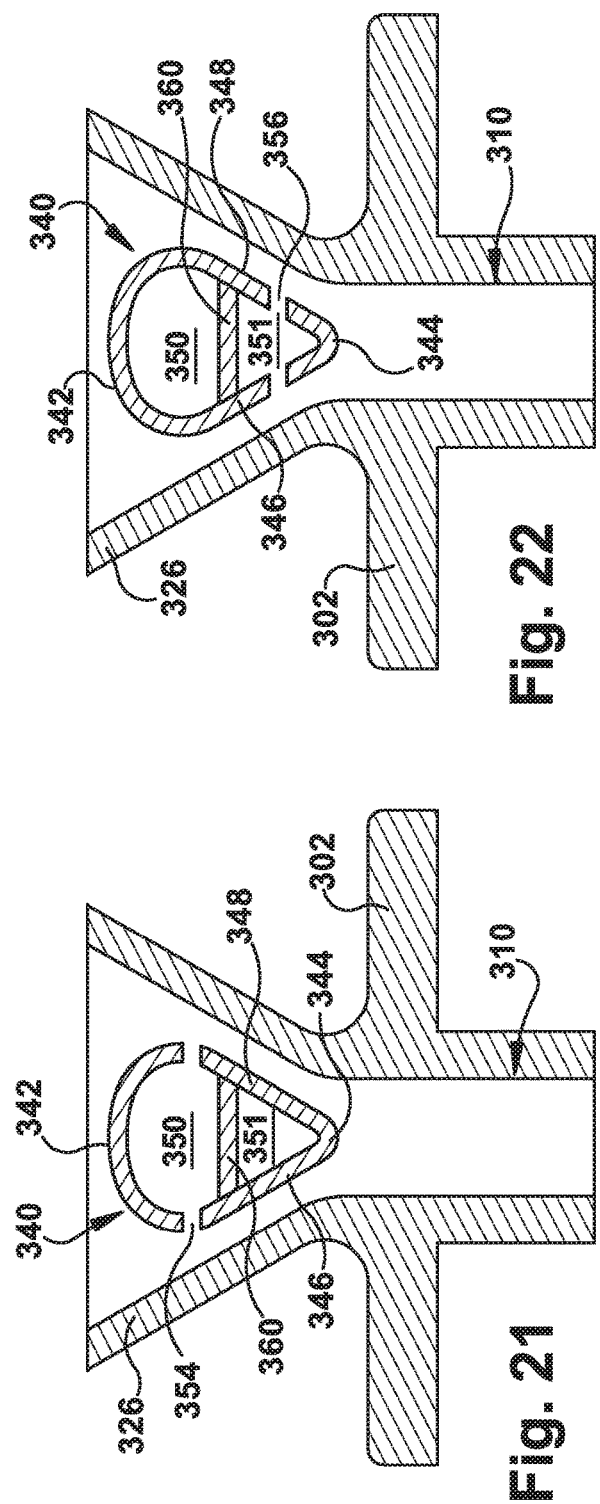

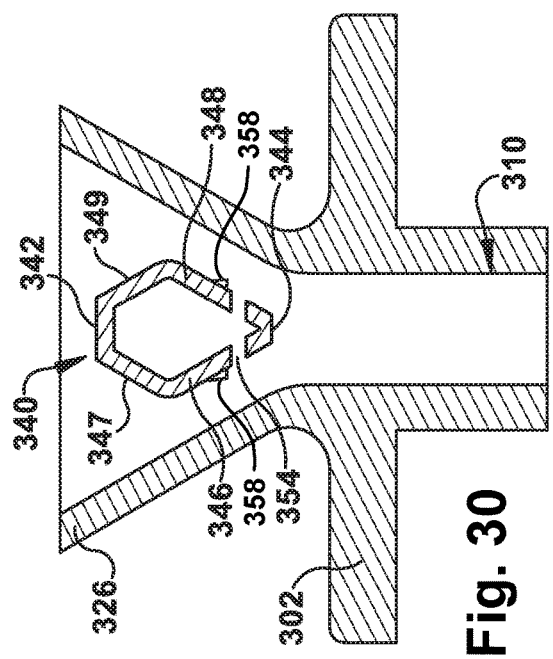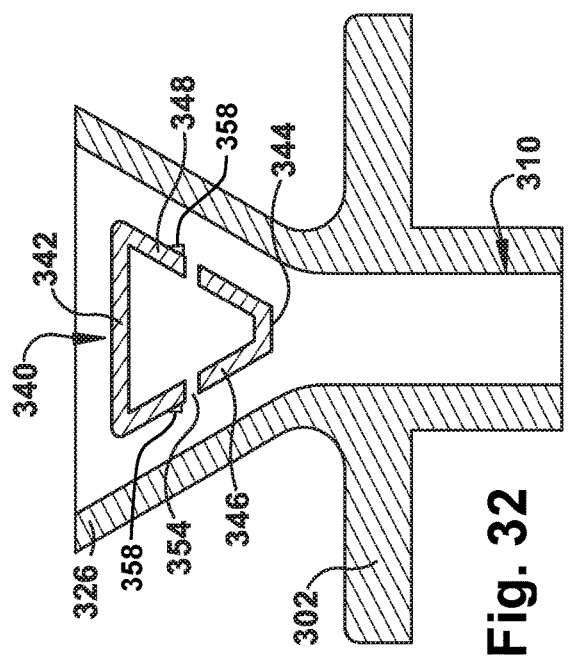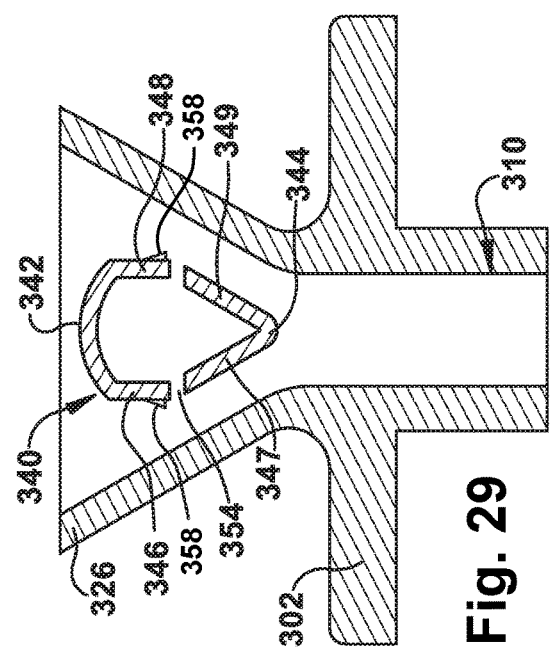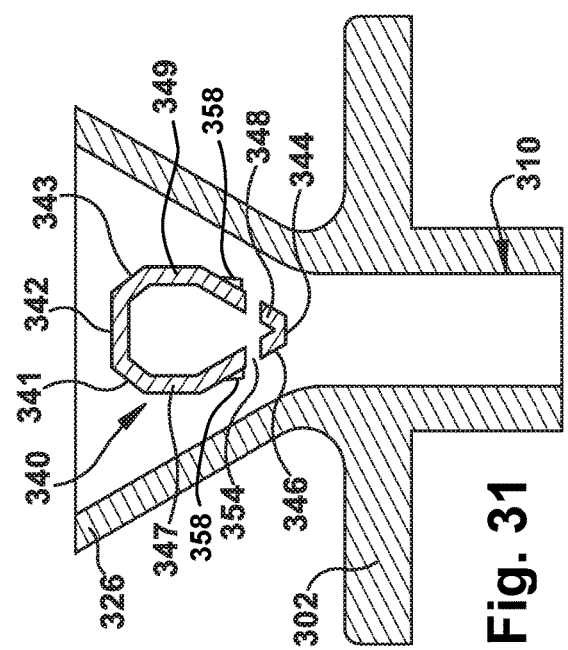

FUEL INJECTORS AND METHODS OF USE IN GAS TURBINE COMBUSTOR

CROSS-REFERENCE TO RELATED APPLICATIONS

This application is a continuation-in-part, and claims priority to U.S. patent application Ser. No. 15/395,314, filed Dec. 30, 2016 for "FUEL INJECTORS AND METHODS OF USE IN GAS TURBINE COMBUSTOR", which is incorporated by reference herein in its entirety.

BACKGROUND

The present disclosure relates generally to fuel injectors for gas turbine combustors and, more particularly, to fuel injectors for use with an axial fuel staging (AFS) system associated with such combustors.

At least some known gas turbine assemblies include a compressor, a combustor, and a turbine. Gas (e.g., ambient air) flows through the compressor, where the gas is compressed before delivery to one or more combustors. In each combustor, the compressed air is combined with fuel and ignited to generate combustion gases. The combustion gases are channeled from each combustor to and through the turbine, thereby driving the turbine, which, in turn, powers an electrical generator coupled to the turbine. The turbine may also drive the compressor by means of a common shaft or rotor.

In some combustors, the generation of combustion gases occurs at two, axially spaced stages. Such combustors are referred to herein as including an "axial fuel staging" (AFS) system, which delivers fuel and an oxidant to one or more downstream fuel injectors. In a combustor with an AFS system, a primary fuel nozzle at an upstream end of the combustor injects fuel and air (or a fuel/air mixture) in an axial direction into a primary combustion zone, and an AFS fuel injector located at a position downstream of the primary fuel nozzle injects fuel and air (or a second fuel/air mixture) in a radial direction into a secondary combustion zone downstream of the primary combustion zone. In some cases, it is desirable to introduce the fuel and air into the secondary combustion zone as a mixture. Therefore, the mixing capability of the AFS injector influences the overall operating efficiency and/or emissions of the gas turbine.

BRIEF DESCRIPTION

The present disclosure is directed to an AFS fuel injector for delivering a mixture of fuel and air in a radial direction into a combustor, thereby producing a secondary combustion zone.

Specifically, the fuel injector includes a frame having interior sides defining an opening for passage of a first fluid; at least a fuel injection body coupled to the frame and being positioned within the opening such that flow paths for the first fluid are defined between the interior sides of the frame and the fuel injection body, wherein the fuel injection body having a leading edge defines a fuel plenum and a plurality of fuel injection holes in communication with the fuel plenum along at least one outer surface of the fuel injection body; at least one mixing enhancing member coupled to the fuel injection body, wherein the at least one mixing enhancing member is positioned between the plurality of fuel injection holes and the leading edge; and a conduit fitting coupled to the frame and fluidly connected to the fuel plenum.

A combustor for a gas turbine having an axial fuel staging (AFS) system is also provided. The combustor includes a liner that defines a head end, an aft end, and at least one opening through the liner between the head end and the aft end. The axial fuel staging (AFS) system includes a fuel injector and a fuel supply line. The fuel injector is mounted to provide fluid communication through a respective one of the at least one openings in the liner, such that the fluid communication is directed in a radial direction with respect to a longitudinal axis of the liner. The fuel supply line is coupled to the fuel injector. The injector includes: a frame having interior sides defining an opening for passage of a first fluid; and a fuel injection body coupled to the frame and being positioned within the opening such that flow paths for the first fluid are defined between the interior sides of the frame and the fuel injection body. The fuel injection body has a leading edge and defines therein a fuel plenum and a plurality of fuel injection holes in communication with the fuel plenum along at least one outer surface of the fuel injection body. The fuel injection body includes at least one mixing enhancing member coupled to the fuel injection body, wherein the at least one mixing enhancing member is positioned between the plurality of fuel injection holes and the leading edge. The injector further includes a conduit fitting integral with the frame and fluidly connected between the fuel supply line and the first fuel plenum and the second fuel plenum; and an outlet member, which is in fluid communication with the fluid flow paths.

DRAWINGS

A full and enabling disclosure of the present products and methods, including the best mode thereof, directed to one of ordinary skill in the art, is set forth in the specification, which makes reference to the appended figures, in which:

FIG. 20 is a side view of a fuel injection body and fuel inlet, as may be used in the fuel injector of FIG. 2, which includes two sets of offset fuel injection holes and a tube-in-tube fuel inlet;

FIG. 21 is a cross-sectional view of the fuel injection body of FIG. 20, as taken along line I-I of FIG. 20, and further showing the fuel injection body in a fuel injector; and FIG. 22 is a cross-sectional view of the fuel injection body of FIG. 20, as taken along line II-II of FIG. 20, and further showing the fuel injection body in a fuel injector;

FIG. 29 is a cross-sectional view of an alternate embodiment of the fuel injector of FIG. 23, in which the fuel injection body is provided with a pentagon shape having an arcuate leading edge;

FIG. 30 is an alternate embodiment of the fuel injector of FIG. 23, in which the fuel injection body is provided with a hexagon shape;

FIG. 31 is a cross-sectional view of an alternate embodiment of the fuel injector of FIG. 23, in which the fuel injection body is provided with an octagon shape;

FIG. 32 is a cross-sectional view of an alternate embodiment of the fuel injector of FIG. 23, in which the fuel injection body is provided with a trapezoid shape;

DETAILED DESCRIPTION

The following detailed description illustrates various fuel injectors, their component parts, and methods of fabricating the same, by way of example and not limitation. The description enables one of ordinary skill in the art to make and use the fuel injectors. The description provides several embodiments of the fuel injectors, including what is presently believed to be the best modes of making and using the fuel injectors. An exemplary fuel injector is described herein as being coupled within a combustor of a heavy duty gas turbine assembly. However, it is contemplated that the fuel injectors described herein have general application to a broad range of systems in a variety of fields other than electrical power generation.

As used herein, the term "radius" (or any variation thereof) refers to a dimension extending outwardly from a center of any suitable shape (e.g., a square, a rectangle, a triangle, etc.) and is not limited to a dimension extending outwardly from a center of a circular shape. Similarly, as used herein, the term "circumference" (or any variation thereof) refers to a dimension extending around a center of any suitable shape (e.g., a square, a rectangle, a triangle, etc.) and is not limited to a dimension extending around a center of a circular shape.

Figure 1:
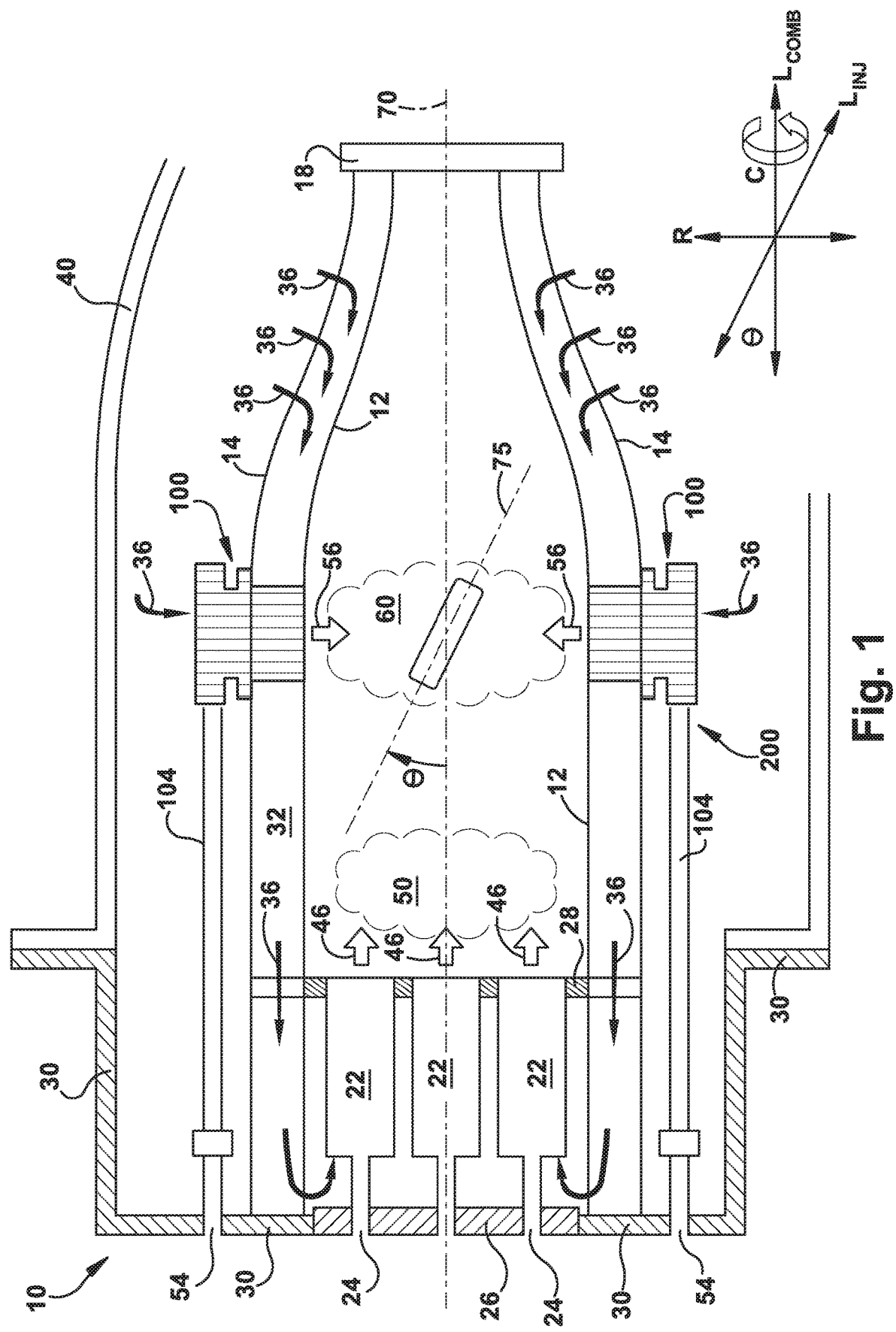
FIG. 1 is a schematic cross-sectional side view of a combustion can, including the present fuel injector.

FIG. 1 is a schematic representation of a combustion can 10, as may be included in a can annular combustion system for a heavy duty gas turbine. In a can annular combustion system, a plurality of combustion cans 10 (e.g., 8, 10, 12, 14, 16, or more) are positioned in an annular array about a rotor that connects a compressor to a turbine. The turbine may be operably connected (e.g., by the rotor) to a generator for producing electrical power.

In FIG. 1, the combustion can 10 includes a liner 12 that contains and conveys combustion gases 66 to the turbine. The liner 12 may have a cylindrical liner portion and a tapered transition portion that is separate from the cylindrical liner portion, as in many conventional combustion systems. Alternately, the liner 12 may have a unified body (or "unibody") construction, in which the cylindrical portion and the tapered portion are integrated with one another. Thus, any discussion of the liner 12 herein is intended to encompass both conventional combustion systems having a separate liner and transition piece and those combustion systems having a unibody liner. Moreover, the present disclosure is equally applicable to those combustion systems in which the transition piece and the stage one nozzle of the turbine are integrated into a single unit, sometimes referred to as a "transition nozzle" or an "integrated exit piece."

The liner 12 is surrounded by an outer sleeve 14, which is spaced radially outward of the liner 12 to define an annulus 32 between the liner 12 and the outer sleeve 14. The outer sleeve 14 may include a flow sleeve portion at the forward end and an impingement sleeve portion at the aft end, as in many conventional combustion systems. Alternately, the outer sleeve 14 may have a unified body (or "unisleeve") construction, in which the flow sleeve portion and the impingement sleeve portion are integrated with one another in the axial direction. As before, any discussion of the outer sleeve 14 herein is intended to encompass both convention combustion systems having a separate flow sleeve and impingement sleeve and combustion systems having a unisleeve outer sleeve.

A head end portion 20 of the combustion can 10 includes one or more fuel nozzles 22. The fuel nozzles 22 have a fuel inlet 24 at an upstream (or inlet) end. The fuel inlets 24 may be formed through an end cover 26 at a forward end of the combustion can 10. The downstream (or outlet) ends of the fuel nozzles 22 extend through a combustor cap 28.

The head end portion 20 of the combustion can 10 is at least partially surrounded by a forward casing 30, which is physically coupled and fluidly connected to a compressor discharge case 40. The compressor discharge case 40 is fluidly connected to an outlet of the compressor (not shown) and defines a pressurized air plenum 42 that surrounds at least a portion of the combustion can 10. Air 36 flows from the compressor discharge case 40 into the annulus 32 at an aft end of the combustion can. Because the annulus 32 is fluidly coupled to the head end portion 20, the air flow 36 travels upstream from the aft end of the combustion can 10 to the head end portion 20, where the air flow 36 reverses direction and enters the fuel nozzles 22.

Fuel and air are introduced by the fuel nozzles 22 into a primary combustion zone 50 at a forward end of the liner 12, where the fuel and air are combusted to form combustion gases 46. In one embodiment, the fuel and air are mixed within the fuel nozzles 22 (e.g., in a premixed fuel nozzle). In other embodiments, the fuel and air may be separately introduced into the primary combustion zone 50 and mixed within the primary combustion zone 50 (e.g., as may occur with a diffusion nozzle). Reference made herein to a "first fuel/air mixture" should be interpreted as describing both a premixed fuel/air mixture and a diffusion-type fuel/air mixture, either of which may be produced by fuel nozzles 22.

The combustion gases 46 travel downstream toward an aft end 18 of the combustion can 10. Additional fuel and air are introduced by one or more fuel injectors 100 into a secondary combustion zone 60, where the fuel and air are ignited by the combustion gases 46 to form a combined combustion gas product stream 66. Such a combustion system having axially separated combustion zones is described as an "axial fuel staging" (AFS) system 200, and the downstream injectors 100 may be referred to as "AFS injectors."

In the embodiment shown, fuel for each AFS injector 100 is supplied from the head end of the combustion can 10, via a fuel inlet 54. Each fuel inlet 54 is coupled to a fuel supply line 104, which is coupled to a respective AFS injector 100. It should be understood that other methods of delivering fuel to the AFS injectors 100 may be employed, including supplying fuel from a ring manifold or from radially oriented fuel supply lines that extend through the compressor discharge case 40.

FIG. 1 further shows that the AFS injectors 100 may be oriented at an angle θ (theta) relative to the longitudinal center line 70 of the combustion can 10. In the embodiment shown, the leading edge portion of the injector 100 (that is, the portion of the injector 100 located most closely to the head end) is oriented away from the center line 70 of the combustion can 10, while the trailing edge portion of the injector 100 is oriented toward the center line 70 of the combustion can 10. The angle θ, defined between the longitudinal axis 75 of the injector 100 and the center line 70, may be between 1 degree and 45 degrees, between 1 degree and 30 degrees, between 1 degree and 20 degrees, or between 1 degree and 10 degrees, or any intermediate value therebetween. In other embodiments, it may be desirable to orient the injector 100, such that the leading edge portion is proximate the center line 70, and the trailing edge portion is distal to the center line 70.

The injectors 100 inject a second fuel/air mixture 56, in a radial direction, into the combustion liner 12, thereby forming a secondary combustion zone 60. The combined hot gases 66 from the primary and secondary combustion zones travel downstream through the aft end 18 of the combustor can 10 and into the turbine section, where the combustion gases 66 are expanded to drive the turbine.

Notably, to enhance the operating efficiency of the gas turbine and to reduce emissions, it is desirable for the injector 100 to thoroughly mix fuel and compressed gas to form the second fuel/air mixture 56. Thus, the injector embodiments described below facilitate improved mixing.

Figure 2:
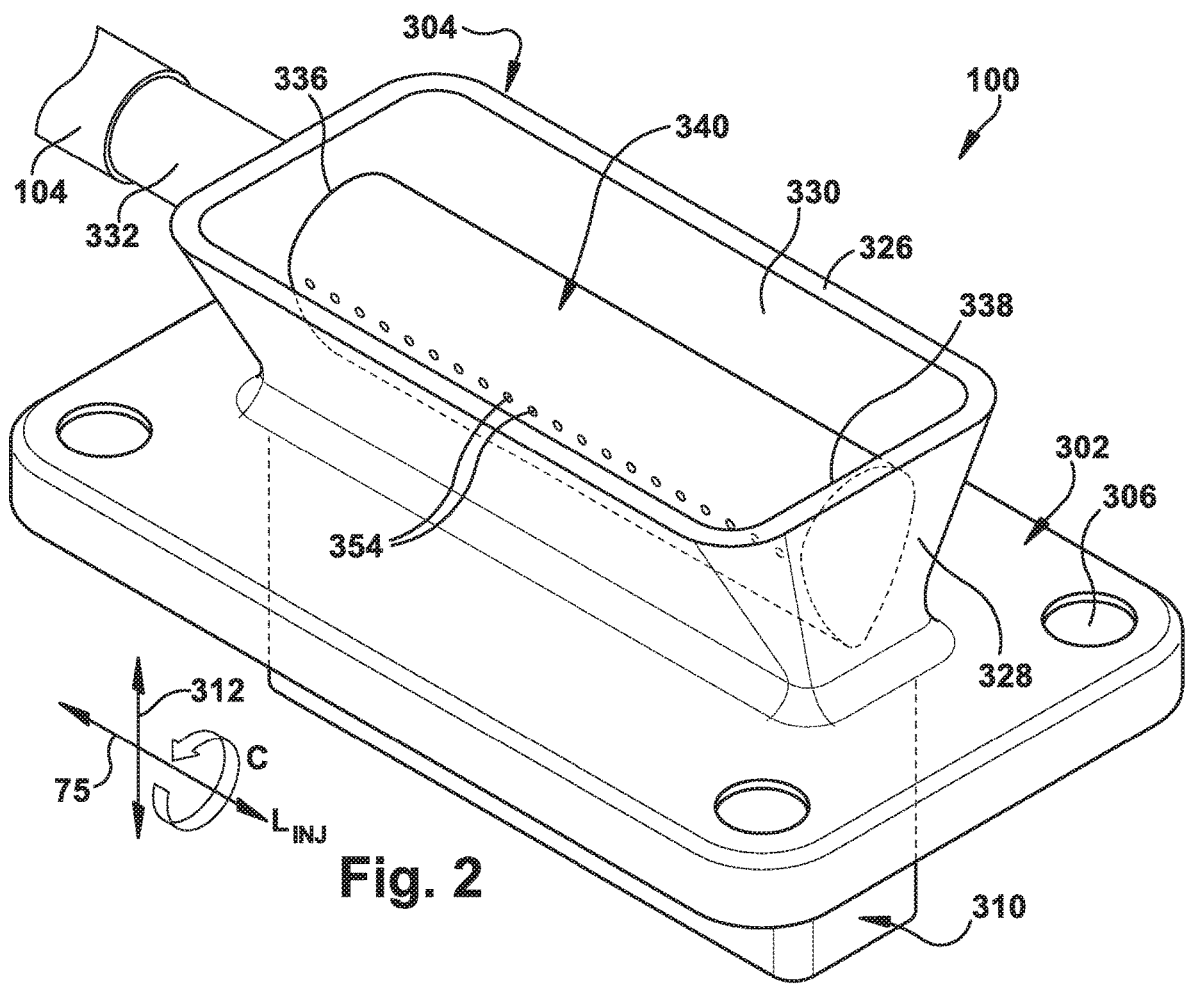
FIG. 2 is a perspective view of a fuel injector having a single fuel injection body, according to one aspect of the present disclosure.
Figure 3:
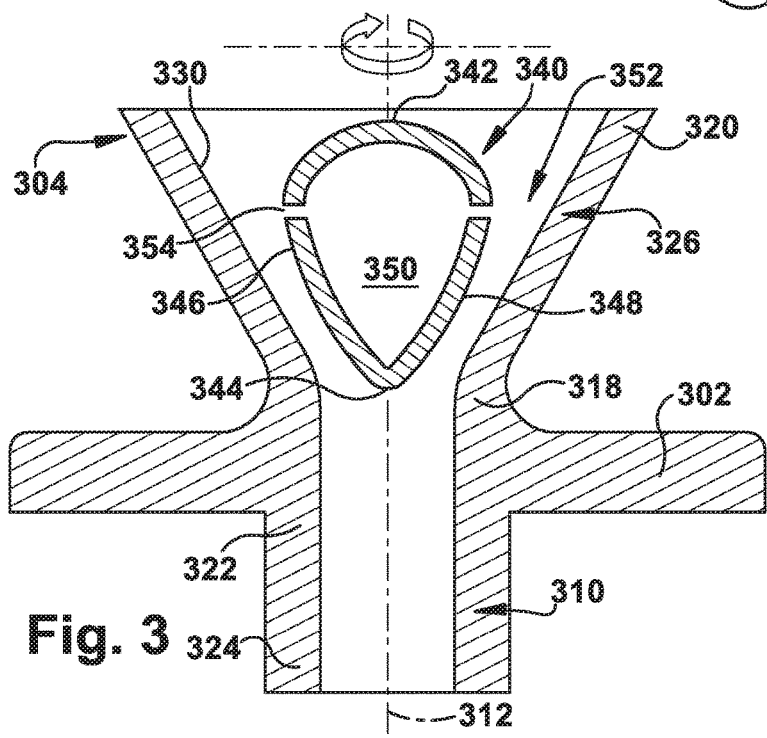
FIG. 3 is a cross-sectional view of the fuel injector of FIG. 2.

FIGS. 2 and 3 are perspective and cross-sectional views, respectively, of an exemplary fuel injector 100 for use in the AFS system 200 described above. In the exemplary embodiment, the fuel injector 100 includes a mounting flange 302, a frame 304, and an outlet member 310 that are coupled together. In one embodiment, the mounting flange 302, the frame 304, and the outlet member 310 are manufactured as a single-piece structure (that is, are formed integrally with one another). Alternately, in other embodiments, the flange 302 may not be formed integrally with the frame 304 and/or the outlet 310 (e.g., the flange 302 may be coupled to the frame 304 and/or the outlet 310 using a suitable fastener). Moreover, the frame 304 and the outlet 310 may be made as an integrated, single-piece unit, which is separately joined to the flange 302.

The flange 302, which is generally planar, defines a plurality of apertures 306 that are each sized to receive a fastener (not shown) for coupling the fuel injector 100 to the outer sleeve 14. The fuel injector 100 may have any suitable structure in lieu of, or in combination with, the flange 302 that enables the frame 304 to be coupled to the outer sleeve 14, such that the injector 100 functions in the manner described herein.

The frame 304 defines the inlet portion of the fuel injector 100. The frame 304 includes a first pair of oppositely disposed side walls 326 and a second pair of oppositely disposed end walls 328. The side walls 326 are longer than the end walls 328, thus providing the frame 304 with a generally rectangular profile in the axial direction. The frame 304 has a generally trapezoid-shaped profile in the radial direction (that is, side walls 326 are angled with respect to the flange 302). The frame 304 has a first end 318 proximal to the flange 302 ("a proximal end") and a second end 320 distal to the flange 302 ("a distal end"). The first ends 318 of the side walls 326 are spaced further from a longitudinal axis of the fuel injector 100 (LINJ) than the second ends of the side walls 326, when compared in their respective longitudinal planes.

The outlet member 310 extends radially from the flange 302 on a side opposite the frame 304. The outlet member 310 defines a uniform, or substantially uniform, cross-sectional area in the radial and axial directions. The outlet member 310 provides fluid communication between the frame 304 and the interior of the liner 12 and delivers the second fuel/air mixture 56 along an injection axis 312 into the secondary combustion zone 60. The outlet member 310 has a first end 322 proximal to the flange 302 and a second end 324 distal to the flange 302 (and proximal to the liner 12), when the fuel injector 100 is installed. Further, when the fuel injector 100 is installed, the outlet member 310 is located within the annulus 32 between the liner 12 and the outer sleeve 14, such that the flange 302 is located on an outer surface of the outer sleeve 14 (as shown in FIG. 1).

Although the injection axis 312 is generally linear in the exemplary embodiment, illustrated in FIG. 3, the injection axis 312 may be non-linear in other embodiments. For example, the outlet member 310 may have an arcuate shape in other embodiments (not shown).

The injection axis 312 represents a radial dimension "R" with respect to the longitudinal axis 70 of the combustion can 10 (LCOMB). The fuel injector 100 further includes a longitudinal dimension (represented as axis LINJ), which is generally perpendicular to the injection axis 312, and a circumferential dimension "C" extending about the longitudinal axis LINJ.

Thus, the frame 304 extends radially from the flange 302 in a first direction, and the outlet member 310 extends radially inward from the flange 302 in a second direction opposite the first direction. The flange 302 extends circumferentially around (that is, circumscribes) the frame 304. The frame 304 and the outlet member 310 extend circumferentially about the injection axis 312 and are in flow communication with one another across the flange 302.

Although the embodiments illustrated herein present the flange 302 as being located between the frame 304 and the outlet member 310, it should be understood that the flange 302 may be located at some other location or in some other suitable orientation. For instance, the frame 304 and the outlet member 310 may not extend from the flange 302 in generally opposite directions.

In one exemplary embodiment, the distal end 320 of inlet member 308 may be wider than the proximal end 318 of the frame 304, such that the frame 304 is at least partly tapered (or funnel-shaped) between the distal end 320 and the proximal end 318. Said differently, in the exemplary embodiment described above, the side walls 326 converge in thickness from the distal end 320 to the proximal end 318.

Further, as shown in FIGS. 2 and 3, the side walls 326 of the frame 304 are oriented at an angle with respect to the flange 302, thus causing the frame 304 to converge from the distal end 320 to the proximal end 318 of the side walls 326. In some embodiments, the end walls 328 may also or instead be oriented at an angle with respect to the flange 302. The side walls 326 and the end walls 328 have a generally linear cross-sectional profile. In other embodiments, the side walls 326 and the end walls 328 may have any suitable cross-sectional profile(s) that enables the frame 304 to be at least partly convergent (i.e., tapered) between distal end 320 and proximal end 318 (e.g., at least one side wall 326 may have a cross-sectional profile that extends arcuately between ends 320 and 318). Alternatively, the frame 304 may not taper between ends 320 and 318 (e.g., in other embodiments, when the side walls 326 and the end walls 328 may each have a substantially linear cross-sectional profile that are oriented substantially parallel to injection axis 312).

In the exemplary embodiment, the fuel injector 100 further includes a conduit fitting 332 and a fuel injection body 340. The conduit fitting 332 is formed integrally with one of the end walls 328 of the frame 304, such that the conduit fitting 332 extends generally outward along the longitudinal axis (LINJ) of the injector 100. The conduit fitting 332 is connected to the fuel supply line 104 and receives fuel therefrom. The conduit fitting 332 may have any suitable size and shape, and may be formed integrally with, or coupled to, any suitable portion(s) of the frame 304 that enable the conduit fitting 332 to function as described herein (e.g., the conduit fitting 332 may be formed integrally with a side wall 326 in some embodiments).

The fuel injection body 340 has a first end 336 that is formed integrally with the end wall 328 through which the conduit fitting 332 projects and a second end 338 that is formed integrally with the end wall 328 on the opposite end of the fuel injector 100. The fuel injection body 340, which extends generally linearly across the frame 304 between the end walls 328, defines an internal fuel plenum 350 that is in fluid communication with the conduit fitting 332. In other embodiments, the fuel injection body 340 may extend across the frame 304 from any suitable portions of the frame 304 that enable the fuel injection body 340 to function as described herein (e.g., the fuel injection body 340 may extend between the side walls 326). Alternately, or additionally, the fuel injection body 340 may define an arcuate shape between oppositely disposed walls (326 or 328).

As mentioned above, the fuel injection body 340 has a plurality of surfaces that form a hollow structure that defines the internal plenum 350 and that extends between the end walls 328 of the frame 304. When viewed in a cross-section taken from perpendicular to the longitudinal axis LINJ, the fuel injection body 340 (in the present embodiment) generally has the shape of an inverted teardrop with a curved leading edge 342, an oppositely disposed trailing edge 344, and a pair of opposing fuel injection surfaces 346, 348 that extend from the leading edge 342 to the trailing edge 344. The fuel plenum 350 does not extend into the flange 302 or within the frame 304 (other than the fluid communication through the end wall 328 into the conduit fitting 332).

The fuel injection body 340 is oriented such that the leading edge 342 is proximate the distal end 320 of the side walls 326 (i.e., the leading edge 342 faces away from the proximal end 318 of the side walls 326). The trailing edge 344 is located proximate the proximal end 318 of the side walls 326 (i.e., the trailing edge 344 faces away from the distal end 320 of the side walls 326). Thus, the trailing edge 344 is in closer proximity to the flange 302 than is the leading edge 342.

Each fuel injection surface 346, 348 faces a respective interior surface 330 of the side walls 326, thus defining a pair of flow paths 352 that intersect with one another downstream of the trailing edge 344 and upstream of, or within, the outlet member 310. While the flow paths 352 are shown as being of uniform dimensions from the distal end 320 of the frame 304 to the proximal end 318 of the frame 304, it should be understood that the flow paths 352 may converge from the distal end 320 to the proximal end 318, thereby accelerating the flow.

Each fuel injection surface 346, 348 includes a plurality of fuel injection ports 354 that provide fluid communication between the internal plenum 350 and the flow paths 352. The fuel injection ports 354 are spaced along the length of the fuel injection surfaces 346, 348 (see FIG. 2), for example, in any manner (e.g., one or more rows) suitable to enable the fuel injection body 340 to function as described herein.

Notably, the fuel injector 100 may have more than one fuel injection body 340 extending across the frame 304 in any suitable orientation that defines a suitable number of flow paths 352. For example, in the embodiment shown in FIGS. 4 and 5, the fuel injector 100 includes a pair of adjacent fuel injection bodies 340 that define three spaced flow paths 352 within the frame 304. In one embodiment, the flow paths 352 are equally spaced, as results from the fuel injection bodies 340 being oriented at the same angle with respect to the injection axis 312. Each fuel injection body 340 includes a plurality of fuel injection ports 354 on at least one fuel injection surface 346 or 348, as described above, such that the fuel injection ports 354 are in fluid communication with a respective plenum 350 defined within each fuel injection body 340. In turn, the plenums 350 are in fluid communication with the conduit fitting 332, which receives fuel from the fuel supply line 104.

Referring now to both the single- and double-injection body embodiments shown in FIGS. 2-5, during certain operations of the combustion can 10, compressed gas flows into the frame 304 and through the flow paths 352. Simultaneously, fuel is conveyed through the fuel supply line 104 and through the conduit fitting 332 to the internal plenum(s) 350 of the one or more fuel injection bodies 340. Fuel passes from the plenum 350 through the fuel injection ports 354 on the fuel injection surfaces 346 and/or 348 of each fuel injection body 340, in a substantially radial direction relative to the injection axis 312, and into the flow paths 352, where the fuel mixes with the compressed air. The fuel and the compressed air form the second fuel/air mixture 56, which is injected through the outlet member 310 into the secondary combustion zone 60 (as shown in FIG. 1).

Figure 8:
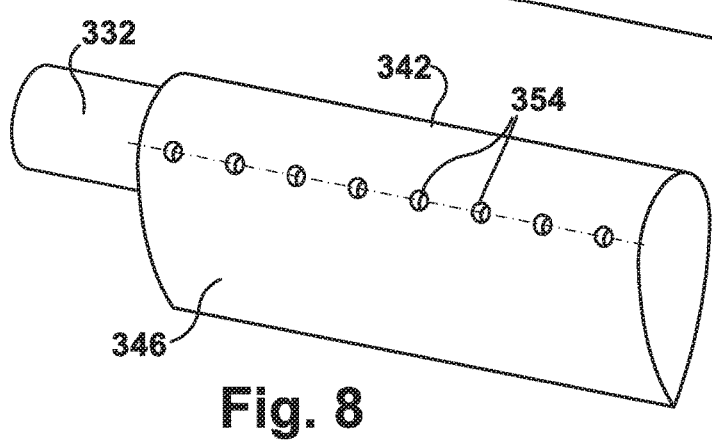
FIG. 8 is a perspective view of a first side of a fuel injector body, as may be used in the fuel injector of FIG. 2 or FIG. 4.
Figure 9:
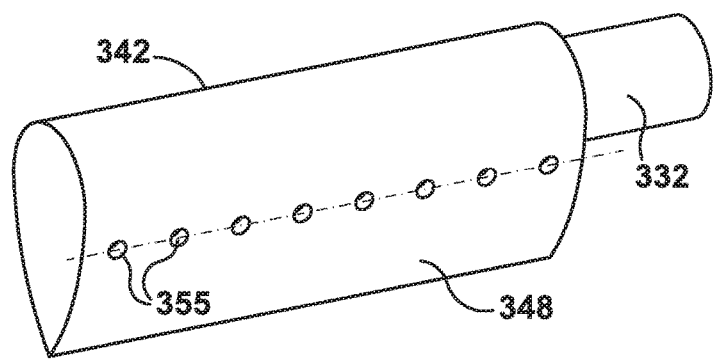
FIG. 9 is a perspective of a second side of the fuel injector body of FIG. 8.

FIGS. 6 through 22 describe further additional embodiments of the present disclosure, which may be used in the fuel injector 100 having one or more fuel injection bodies. Although each fuel injection surface 346, 348 of the fuel injection body 340 has a substantially linear cross-sectional profile and is oriented substantially parallel with its respective wall side segment in the exemplary embodiment, each fuel injection surface 346, 348 may have any suitable orientation in other embodiments. While the fuel injection ports 354 are described as being located on each fuel injection surface 346, 348 of the fuel injection body 340, it should be understood that the fuel injection ports 354 may be located along a single fuel injection surface (i.e., 346 or 348). Further, although the fuel injection ports 354 are shown as being spaced evenly along the length of the fuel injection surfaces 346 (and 348, by extension), it should be understood that the fuel injection ports 354 may be spaced non-uniformly, as shown, for example, in FIGS. 6 and 7. FIGS. 8 and 9 illustrate opposing fuel injection surfaces 346, 348, in which the fuel injection ports 354, 355 are located in different planes. The fuel injection body may not be generally teardrop-shaped in other embodiments, as shown, for example, in FIGS. 10-18.

Figure 5:
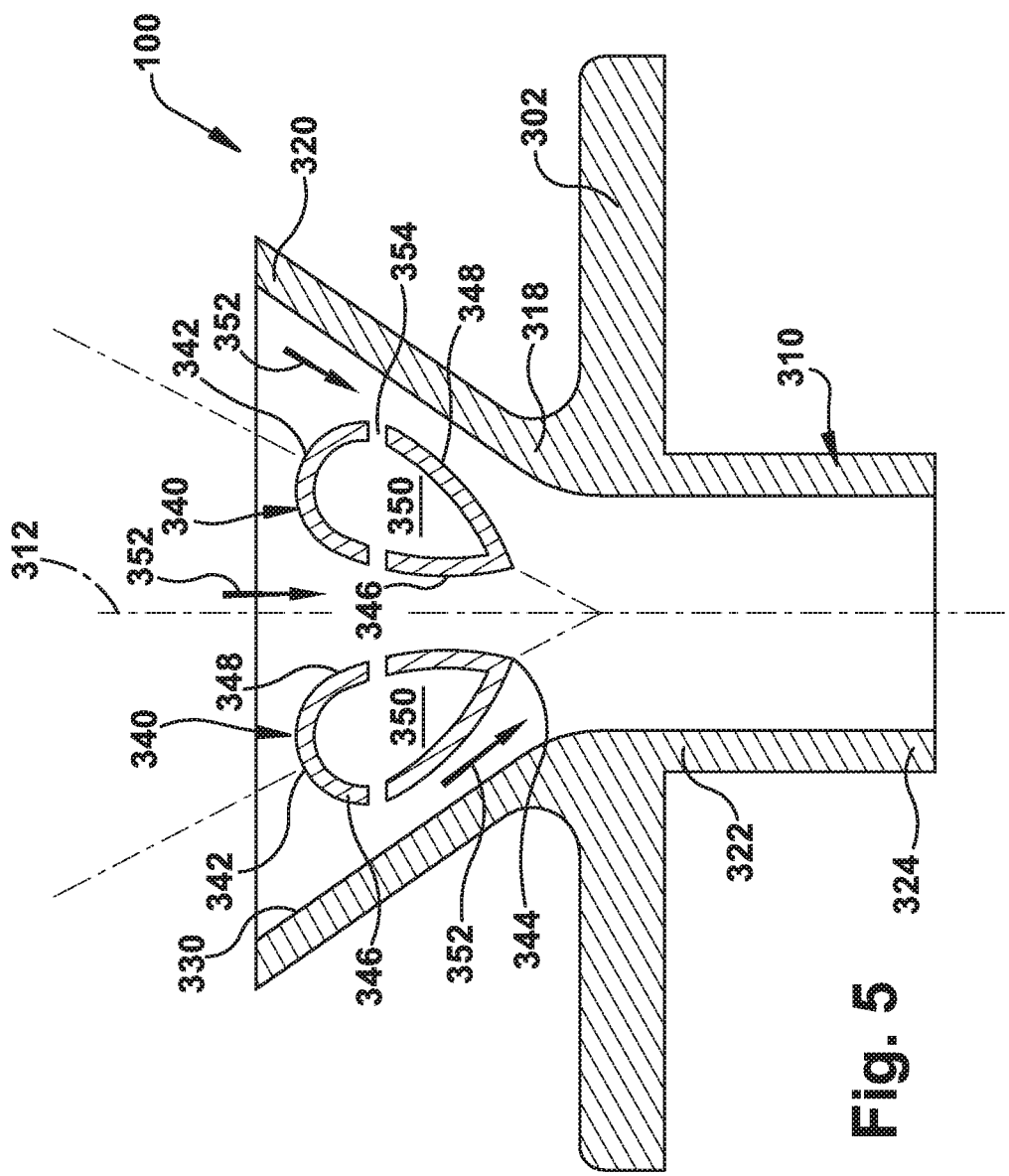
FIG. 5 is a cross-sectional view of the fuel injector of FIG. 4.
Figure 19:
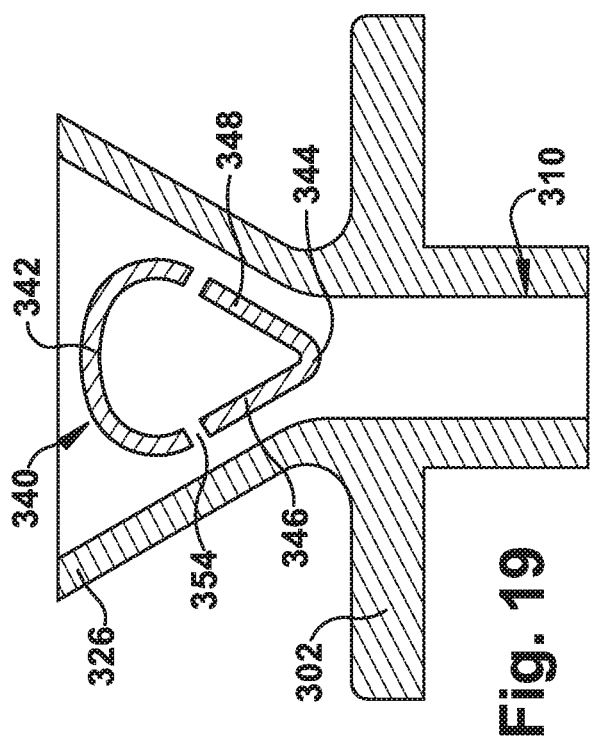
FIG. 19 is a cross-sectional view of an alternate embodiment of the fuel injector of FIG. 2, in which fuel injection holes on the fuel injection body are angled relative to the injection surfaces.

Additionally, or alternatively, although the fuel injection ports 354 are shown in FIG. 3 and FIG. 5 as being oriented normal (i.e., perpendicular) to the injection axis 312, it should be understood that the fuel injection ports 354 may be oriented at an angle with respect to the injection axis 312, as shown, for example, in FIG. 19. Further, FIGS. 20 through 22 illustrate an embodiment in which the fuel injection body 340 defines two fuel plenums 350, 351, which are fluidly connected to respective fuel injection ports 354, 356 on the fuel injection surfaces 346, 348.

Figure 6:
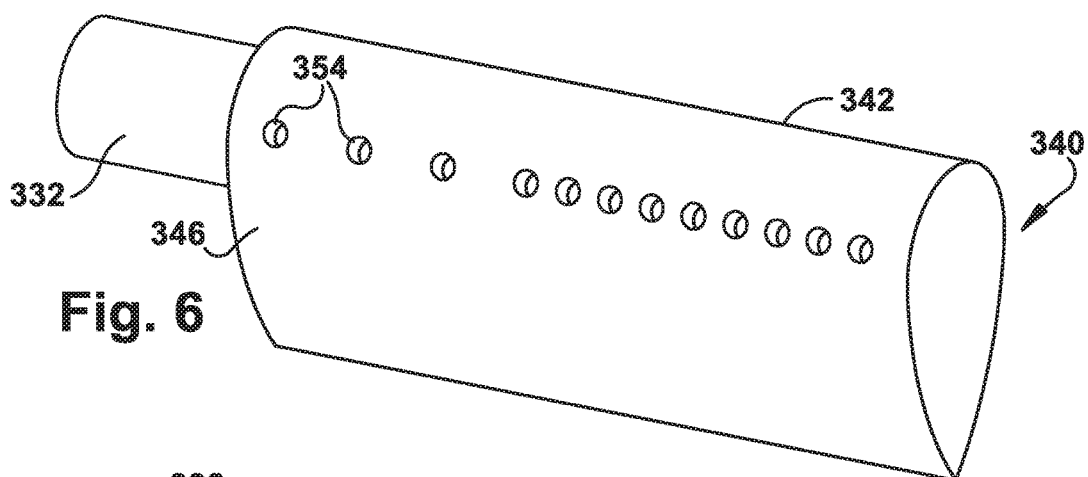
FIG. 6 is a perspective view of a fuel injector body, as may be used in the fuel injector of FIG. 2 or FIG. 4.

Turning now to FIG. 6, a representative fuel injection body 340 is illustrated, in which a greater proportion of the fuel injection ports 354 are located in that portion of the fuel injection surface 346 opposite the conduit fitting 332, and a smaller proportion of the fuel injection ports 354 are located in the portion of the fuel injection surface 346 nearest the conduit fitting 332. That is, the fuel injection ports 354 are spaced closer to one another along that portion of the fuel injection surface 346, which is opposite the conduit fitting 332.

Figure 7:
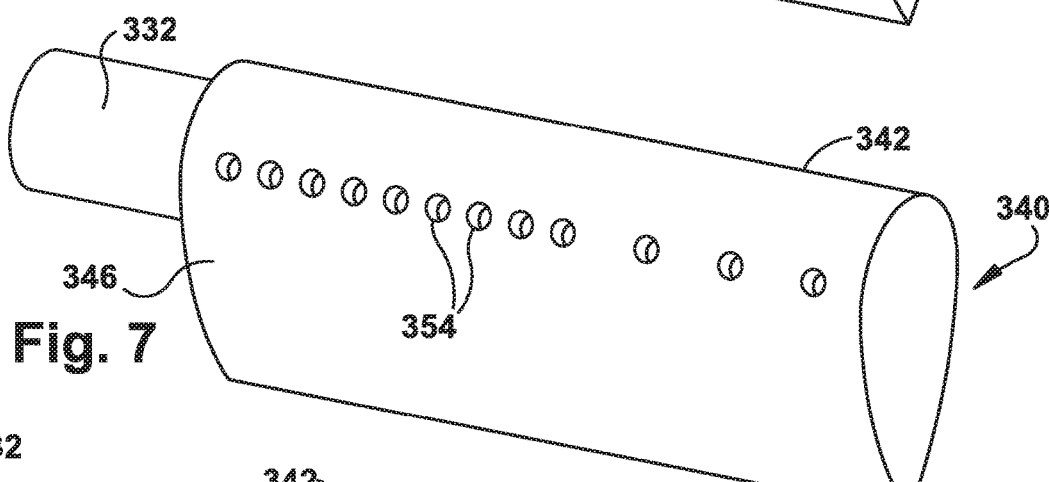
FIG. 7 is a perspective view of a fuel injector body, as may be used in the fuel injector of FIG. 2 or FIG. 4.

FIG. 7 illustrates an alternate, exemplary fuel injection body 340, in which a greater proportion of the fuel injection ports 354 are located in that portion of the fuel injection surface 346 nearest the conduit fitting 332, and a smaller proportion of the fuel injection ports 354 are located in the portion of the fuel injection surface 346 opposite the conduit fitting 332. That is, the fuel injection ports 354 are spaced closer to one another along that portion of the fuel injection surface 346, which is near the conduit fitting 332, as opposed the fuel injection ports 354 are spaced opposite the conduit fitting 332.

It is also conceived that the fuel injection ports 354 may be sized differently in one area of the fuel injection surface 346 (and/or 348). That is, one or more of the fuel injection ports 354 may be larger or smaller than other fuel injection ports 354 located on the same fuel injection surface 346 (or 348) or on the same fuel injection body (e.g., 340) or within the same fuel injector 100.

FIGS. 8 and 9 illustrate exemplary embodiments of a fuel injection body 340 having a first fuel injection surface 346 with fuel injection ports 354 and a second fuel injection surface 348 with fuel injection ports 355. As shown, the fuel injection ports 354 on the first fuel injection surface 346 are positioned in a row defining a first plane, while the fuel injection ports 356 on the second fuel injection surface 348 are positioned in a row defining a second plane different from the first plane. In this exemplary embodiment, the fuel injection body 340 is provided with a single internal plenum 350, which supplies both sets of fuel injection ports 354, 355. However, because the fuel injection ports 354, 355 are positioned in different planes, the residence time of the fuel/air mixture from the injection ports 354, 355 to the aft frame 18 is slightly different.

Figure 4:
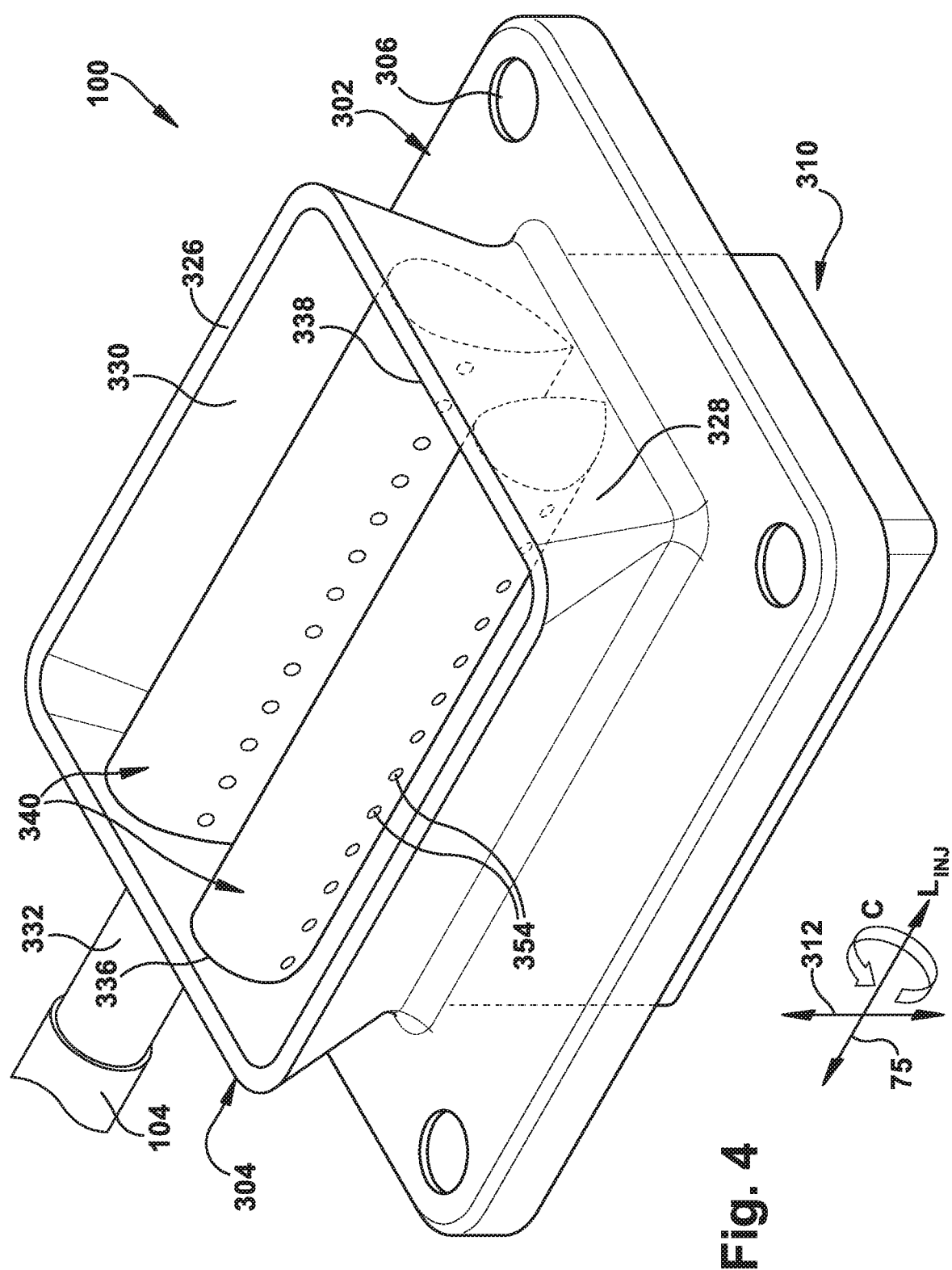
FIG. 4 is a perspective view of a fuel injector having a pair of fuel injection bodies, according to another aspect of the present disclosure.

It should be understood that a similar arrangement of fuel injection ports in multiple planes may be accomplished in a fuel injector having multiple fuel injection bodies 340, such as the fuel injector 100 shown in FIGS. 4 and 5. For instance, the fuel injection ports 354 on the first fuel injection body 340 may be located in a first plane (or a first and second plane), while the fuel injection ports 354 on the second fuel injection body 340 may be located in a different third plane (or a third and fourth plane). Further, many possible distributions of the fuel injection ports 354 in different planes may be employed, whether in a single fuel injection body injector or in an injector having multiple fuel injection bodies 340.

FIGS. 10 through 18 define exemplary shapes of the fuel injection body 340, which may be used in the fuel injector 100 of FIG. 2. Although a single fuel injection body 340 is shown, it should be understood that multiple fuel injection bodies having the same or different shapes may be used, as determined suitable for the purposes described herein.

Figure 10:
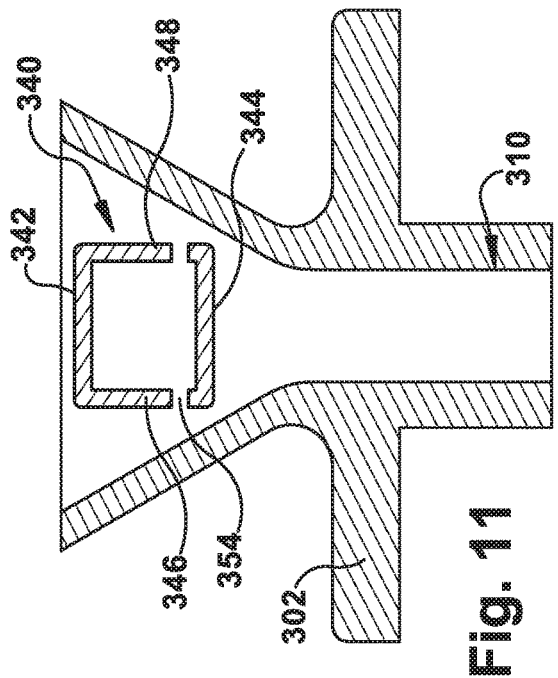
FIG. 10 is a cross-sectional view of an alternate embodiment of the fuel injector of FIG. 2, in which the fuel injection body is provided with a triangular shape.
Figure 11:
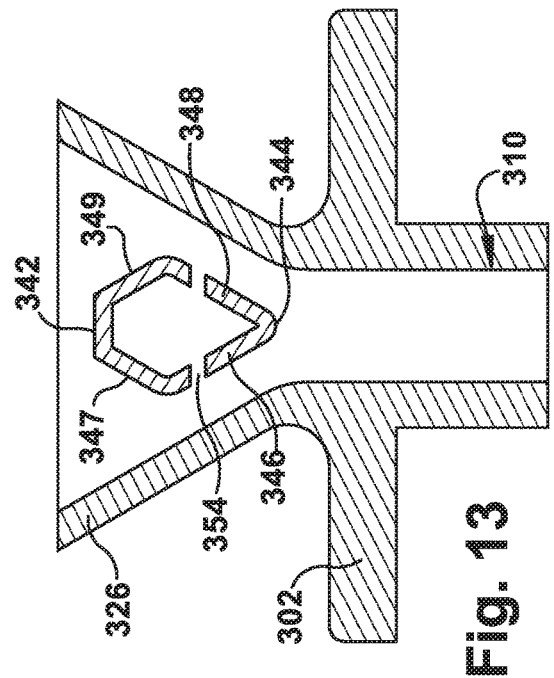
FIG. 11 is a cross-sectional view of an alternate embodiment of the fuel injector of FIG. 2, in which the fuel injection body is provided with a square shape.
Figure 12:
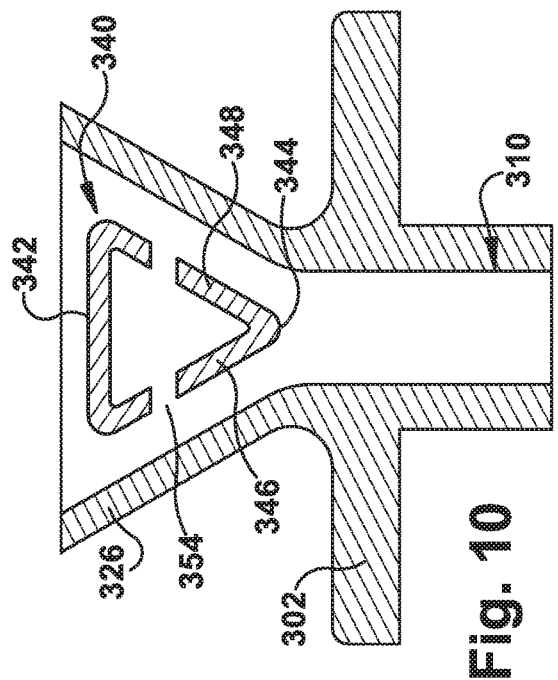
FIG. 12 is a cross-sectional view of an alternate embodiment of the fuel injector of FIG. 2, in which the fuel injection body is provided with a diamond shape.

In FIG. 10, the fuel injection body 340 has a generally triangular shape, in which the leading edge 342 is substantially linear (rather than being arcuate as shown in FIG. 3 or 5). FIG. 11 shows a fuel injection body 340 having a square cross-sectional shape, in which the leading edge 342 and the trailing edge 344 are substantially parallel to one another; and the leading edge 342 and the trailing edge 344 are generally perpendicular to the fuel injection surfaces 346, 348. In FIG. 12, the fuel injection body 340 has a generally diamond shape, in which the two leading edges 342 are present opposite the trailing edge 344 with fuel injection surfaces 346, 348 intersecting at the trailing edge 344.

Figure 13:
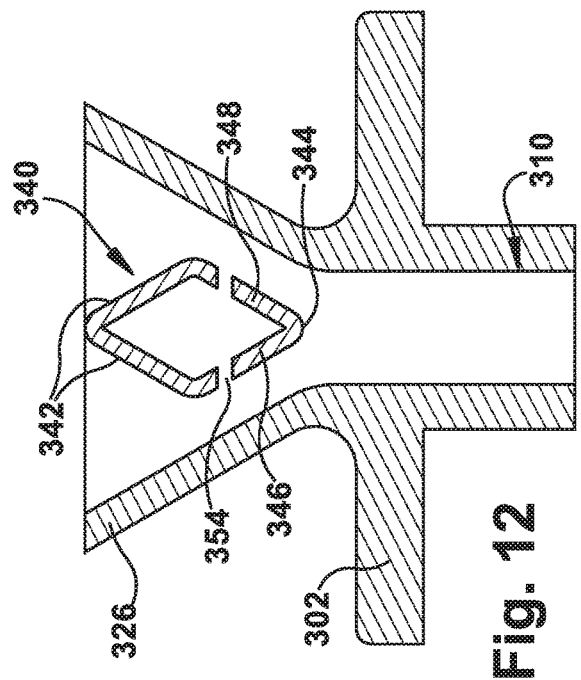
FIG. 13 is a cross-sectional view of an alternate embodiment of the fuel injector of FIG. 2, in which the fuel injection body is provided with a pentagon shape.
Figure 14:
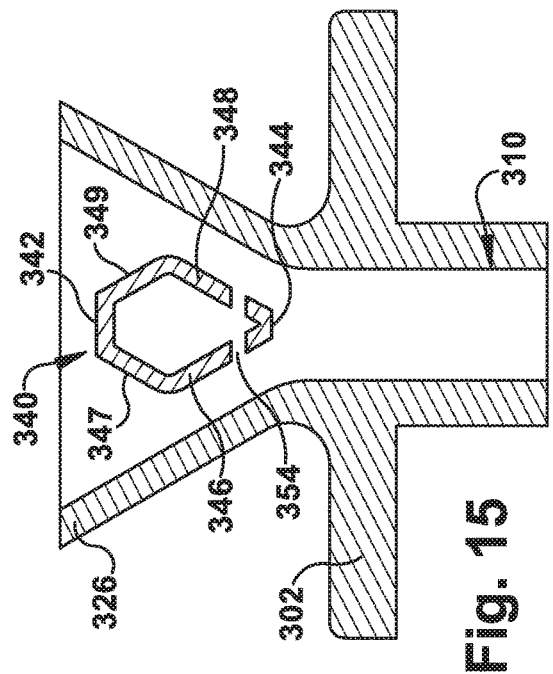
FIG. 14 is a cross-sectional view of an alternate embodiment of the fuel injector of FIG. 2, in which the fuel injection body is provided with a pentagon shape having an arcuate leading edge.

FIG. 13 illustrates a fuel injection body 340 having a pentagon-shaped cross-section. The fuel injection body 340 has a linear leading edge 342; a pair of fuel injection surfaces 346, 348; a pair of intermediate surfaces 347, 349 located between the leading edge 342 and the respective fuel injection surfaces 346, 348; and a trailing edge 344 at the intersection of the fuel injection surfaces 346, 348. FIG. 14 illustrates a fuel injection body 340 having an alternate pentagon-shaped cross-section. In this embodiment, the fuel injection body 340 has an arcuate leading edge 342; a pair of fuel injection surfaces 346, 348; a pair of intermediate surfaces 347, 349 located between the fuel injection surfaces 346, 348 and the trailing edge 344; and a trailing edge 344 at the intersection of the intermediate surfaces 347, 349. Thus, the exemplary embodiments of FIGS. 13 and 14 provide an arcuate or linear leading edge and different locations of the intermediate surfaces 347, 349 (i.e., either upstream or downstream of the fuel injection surfaces 346, 348).

Figure 15:
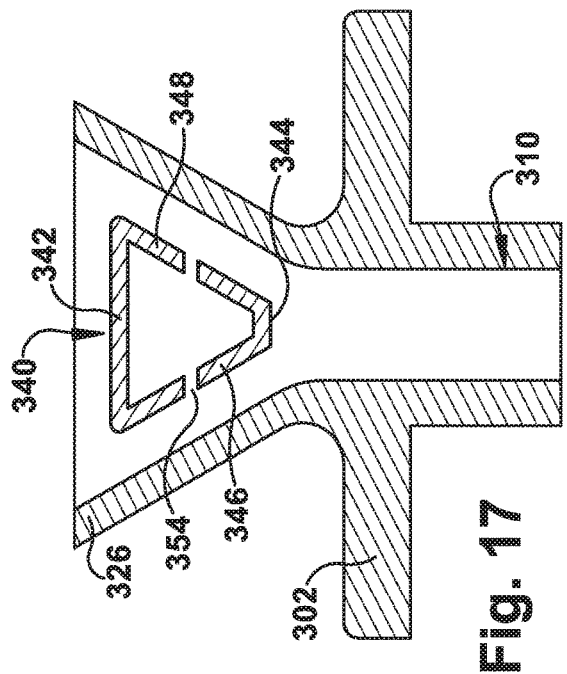
FIG. 15 is an alternate embodiment of the fuel injector of FIG. 2, in which the fuel injection body is provided with a hexagon shape.
Figure 16:
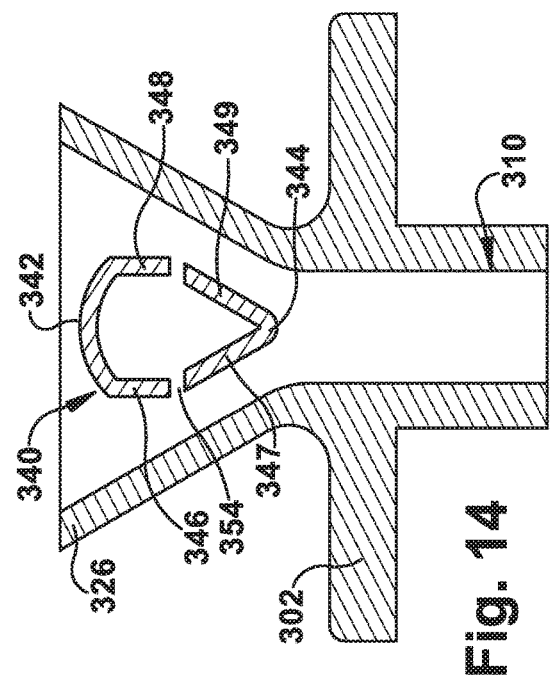
FIG. 16 is a cross-sectional view of an alternate embodiment of the fuel injector of FIG. 2, in which the fuel injection body is provided with an octagon shape.
Figure 17:
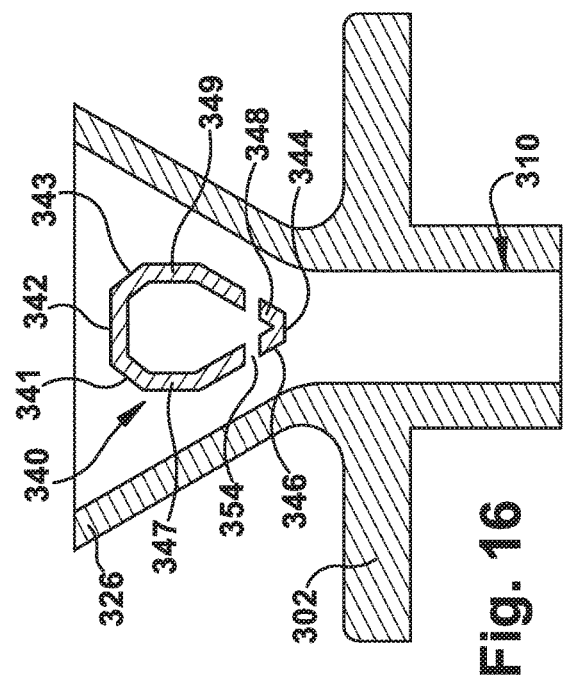
FIG. 17 is a cross-sectional view of an alternate embodiment of the fuel injector of FIG. 2, in which the fuel injection body is provided with a trapezoid shape.

FIG. 15 illustrates an exemplary fuel injector body 340 having a generally hexagonal shape, in which the leading edge 342 and the trailing edge 344 are generally parallel to one another. Two intermediate surfaces 347, 349 are located between the leading edge 342 and the fuel injection surfaces 346, 348, respectively. The fuel injection surfaces 346, 348 intersect with the trailing edge 344. In FIG. 16, the fuel injection body 340 has a generally octagonal shape. Again, the leading edge 342 and the trailing edge 344 are substantially parallel to one another; the fuel injection surfaces 346, 348 intersect with the trailing edge 344; and the intermediate surfaces 347, 349, respectively, are located immediately upstream of the fuel injection surfaces 346, 348. In this exemplary embodiment, a second pair of intermediate surfaces 341, 343 are positioned between the first pair of intermediate surfaces 347, 349 and the leading edge 342. FIG. 17 illustrates an exemplary fuel injection body 340 having a generally trapezoidal shape with a leading edge 342 that is parallel to an oppositely disposed trailing edge 344. In this embodiment, the fuel injection surfaces 346, 348 are angled relative to the leading edge 342 and the trailing edge 344 and are generally parallel to the side walls 326 of the frame 304 of the fuel injector 100.

Figure 18:
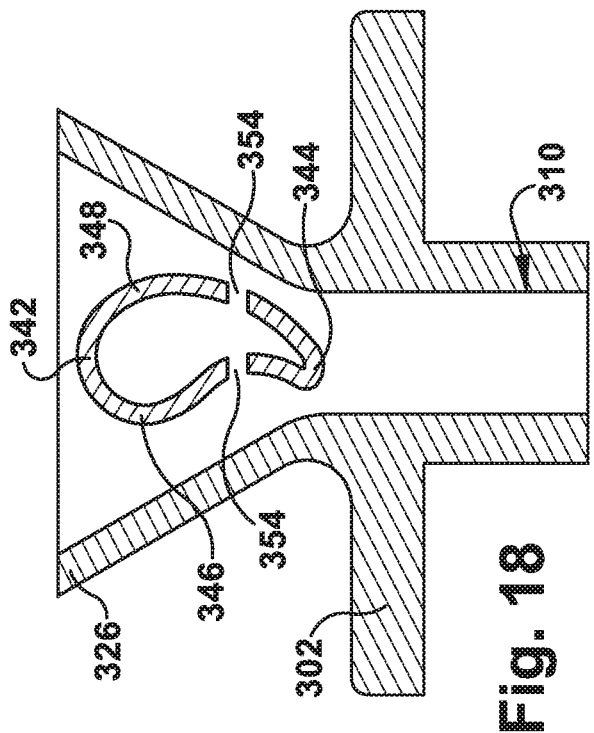
FIG. 18 is a cross-sectional view of an alternate embodiment of the fuel injector of FIG. 2, in which the fuel injection body is provided with an airfoil shape.

FIG. 18 illustrates yet another exemplary fuel injection body 340, in which the fuel injection body 340 is defined as having an airfoil shape. The fuel injection body 340 includes a pressure side and a suction side, either or both of which may function as the fuel injection surfaces. At the upstream portion of the fuel injector 100, the pressure side and the suction side intersect at the leading edge 342. The trailing edge 344 is opposite the leading edge 342, and is located upstream of the outlet member 310 of the fuel injector 100. FIG. 18 is provided as an example of a fuel injection body 340 that is non-symmetrical about the injection axis 312.

FIG. 19 illustrates an embodiment of the fuel injection body 340 of FIG. 2, in which the fuel injection ports 354 are oriented at an angle (i.e., obliquely) with regard to the injection axis 312. It should be appreciated that any angle may be employed for the fuel injection ports 354, as desired.

FIGS. 20-22 provide a fuel injection body 340 defining a first internal plenum 350 and a second internal plenum 351, which are defined by a baffle plate 360 positioned within the fuel injection body 340. In such an embodiment, each plenum 350, 351 is fed by, and in fluid communication with, a separate conduit fitting 332, 333 (respectively), which are supplied by separate fuel supplies (not shown). The conduit fittings 332, 333 may be constructed as a tube-in-tube arrangement, as illustrated, or as two distinct conduit fittings. The fuel injection ports 354 are in fluid communication with the first plenum 350, as shown in FIG. 21, while the fuel injection ports 356 are in fluid communication with the second plenum 351, as shown in FIG. 22. The provision of separately fueled plenums 350, 351 and corresponding fuel injection ports 354, 356 may increase the operational range and/or turndown capability of the present AFS system 200 (shown in FIG. 1).

Figure 23:
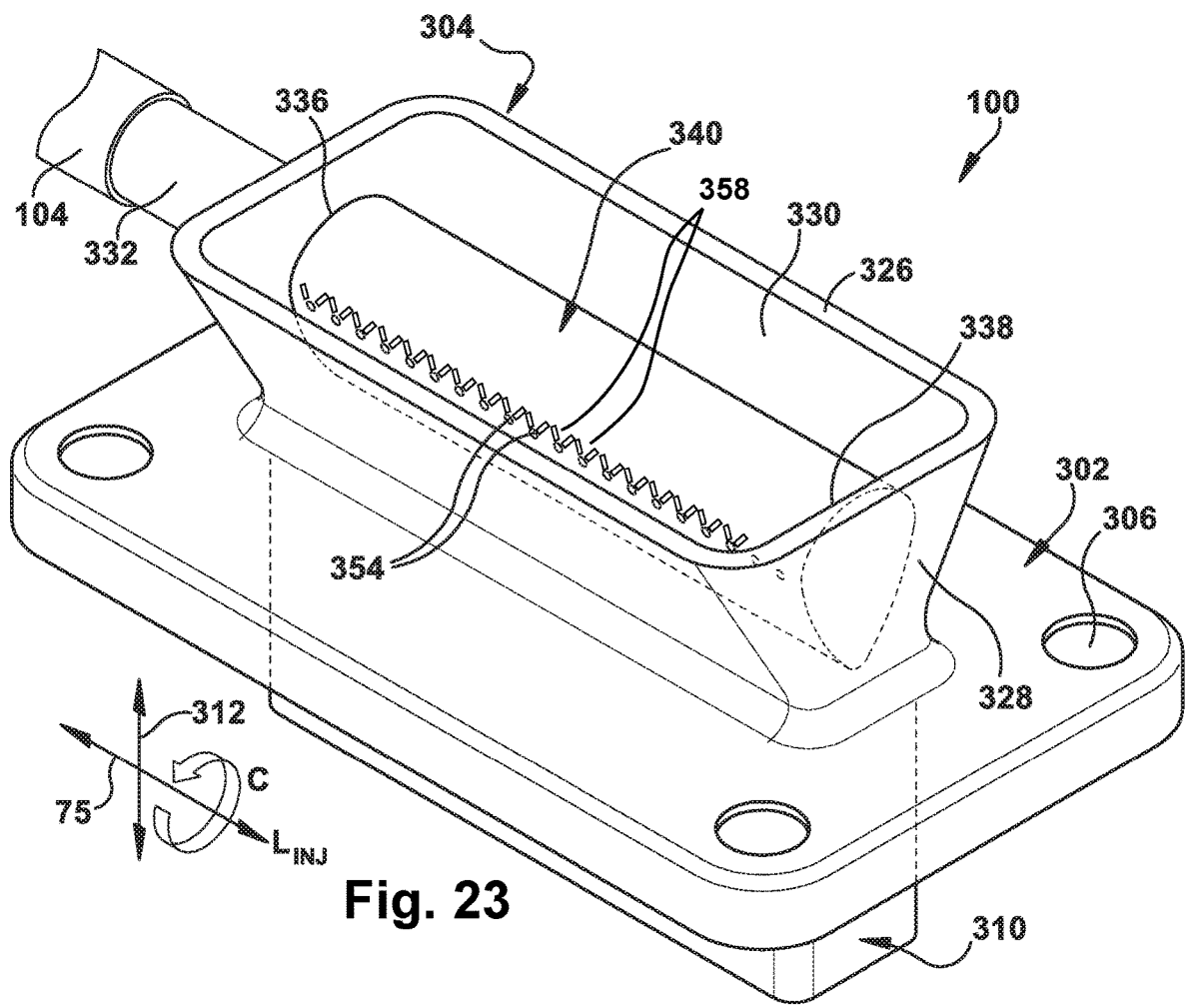
FIG. 23 is a perspective view of a fuel injector having a single fuel injection body and a plurality of mixing enhancing members, according to one aspect of the present disclosure.
Figure 24:
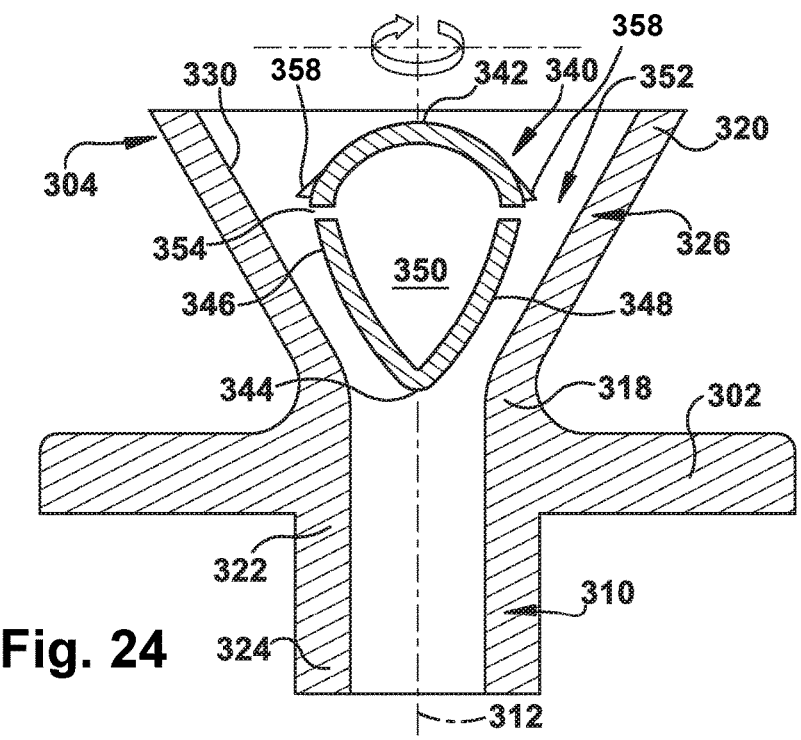
FIG. 24 is a cross-sectional view of the fuel injector of FIG. 23.

FIGS. 23 and 24 are perspective and cross-sectional views, respectively, of an exemplary fuel injector 100 having a plurality of mixing enhancing members 358 for use in the AFS system 200 described above. In the exemplary embodiment, the mixing enhancing members 358 are coupled to the fuel injection body 340. In another embodiment, the mixing enhancing members 358 are formed integrally with the fuel injection body 340. The mixing enhancing members 358 are positioned upstream from the fuel injection ports 354, such as between the fuel injection ports 354 and the leading edge 342. The mixing enhancing members 358 are oriented obliquely relative to the injection axis 312.

In the exemplary embodiment, a pair of mixing enhancing members 358 is positioned upstream from each of the fuel injection ports 154. Alternatively, a pair of mixing enhancing members 358 is positioned upstream from a majority, but not all, of the fuel injection ports 354. The positioning of the pair of mixing enhancing members 358 facilitates the generation of secondary air flow or vortexes at the corresponding fuel injection port 354, which facilitates increasing the mixing of fuel and air at the fuel injection ports 354. In an alternative embodiment, a single mixing enhancing member 358 corresponds to, and is positioned upstream from, each fuel injection port 354.

FIGS. 25 through 34 illustrate exemplary shapes of the fuel injection body 340 having a plurality of mixing enhancing members 358 formed thereon, which may be used in the fuel injector 100 (shown in FIG. 23). Although a single fuel injection body 340 is shown, it should be understood that multiple fuel injection bodies having the same or different shapes may be used, as determined suitable for the purposes described herein.

Figure 25:
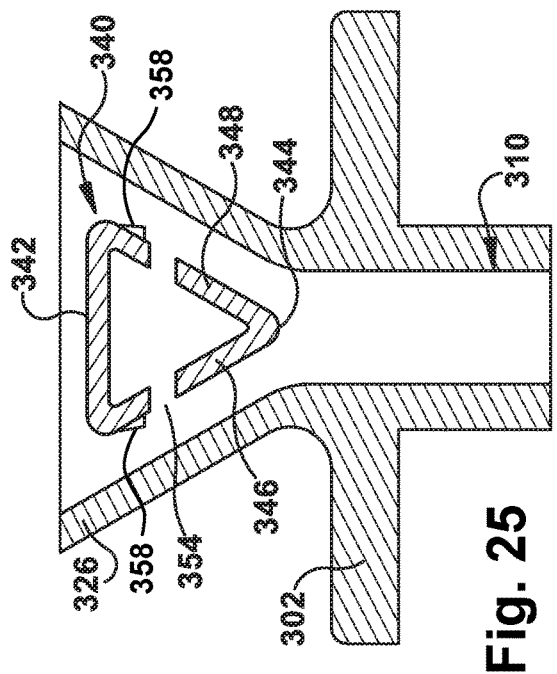
FIG. 25 is a cross-sectional view of an alternate embodiment of the fuel injector of FIG. 23, in which the fuel injection body is provided with a triangular shape.

Referring to FIG. 25, the fuel injection body 340 has generally triangular shape, in which the leading edge 342, defined on one side of the fuel injection body 340, is substantially linear. In addition, the fuel injection body 340 has the pair of mixing enhancing members 358 coupled to, or formed on, the fuel injection surfaces 346, 348.

Figure 26:
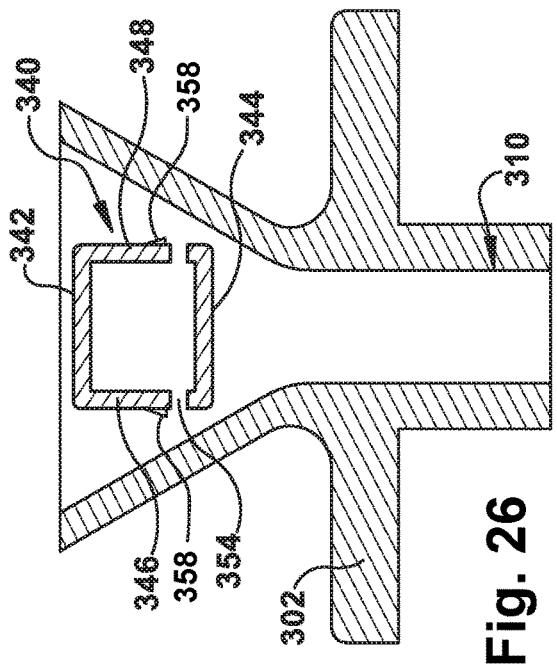
FIG. 26 is a cross-sectional view of an alternate embodiment of the fuel injector of FIG. 23, in which the fuel injection body is provided with a square shape.

Referring to FIG. 26, the fuel injection body 340 has a square cross-sectional shape, in which the leading edge 342 and the trailing edge 344 are substantially parallel to one another. In addition, the leading edge 342 and the trailing edge 344 are oriented generally perpendicularly to the fuel injection surfaces 346 and 348. The fuel injection body 340 has the pair of mixing enhancing members 358 coupled to, or formed on, the fuel injection surfaces 346, 348.

Figure 27:
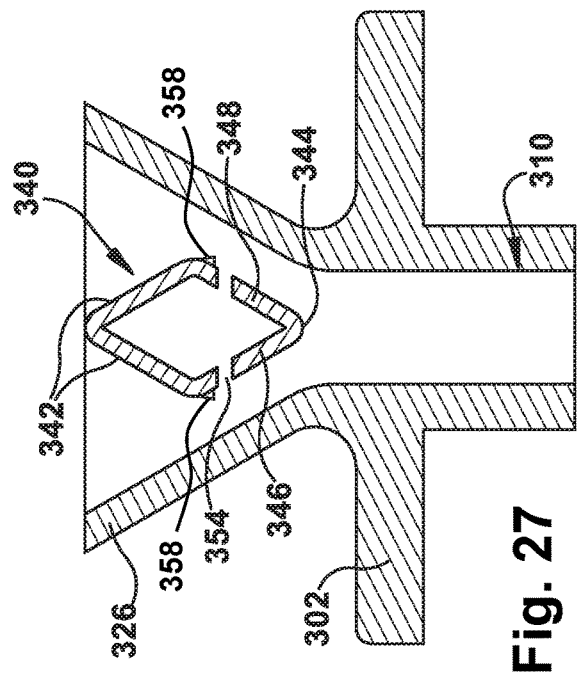
FIG. 27 is a cross-sectional view of an alternate embodiment of the fuel injector of FIG. 23, in which the fuel injection body is provided with a diamond shape.

Referring to FIG. 27, the fuel injection body 340 has a generally diamond shape, in which the two leading edges 342 are present opposite the trailing edge 344 with fuel injection surfaces 346, 348 intersecting at the trailing edge 344. The fuel injection body 340 has the pair of mixing enhancing members 358 coupled to, or formed on, the fuel injection surfaces 346, 348 opposite the two leading edges 342.

Figure 28:
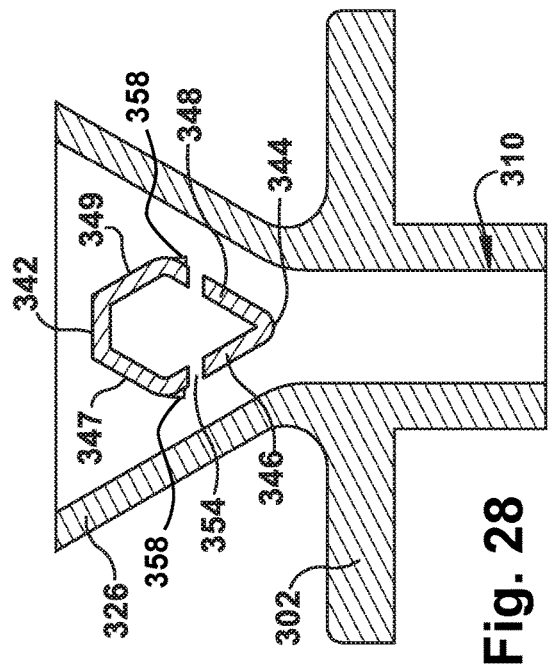
FIG. 28 is a cross-sectional view of an alternate embodiment of the fuel injector of FIG. 23, in which the fuel injection body is provided with a pentagon shape.

FIG. 28 illustrates the fuel injection body 340 having the plurality of mixing enhancing members 358 and a pentagon-shaped cross-section. The fuel injection body 340 has the linear leading edge 342; the pair of fuel injection surfaces 346, 348 having the pair of mixing enhancing members 358 coupled to or formed thereon; the pair of intermediate surfaces 347, 349 located between the leading edge 342 and the respective fuel injection surfaces 346, 348; and the trailing edge 344 at the intersection of the fuel injection surfaces 346, 348.

FIG. 29 illustrates the fuel injection body 340 having the plurality of mixing enhancing members 358 and an alternate pentagon-shaped cross-section. In the exemplary embodiment, the fuel injection body 340 has the arcuate leading edge 342; the pair of fuel injection surfaces 346, 348 having the pair of mixing enhancing members 358 coupled to or formed thereon; the pair of intermediate surfaces 347, 349 located between the fuel injection surfaces 346, 348 and the trailing edge 344; and the trailing edge 344 at the intersection of the intermediate surfaces 347, 349. Thus, the exemplary embodiments of FIGS. 28 and 29 provide an arcuate or linear leading edge and different locations of the intermediate surfaces 347, 349 (i.e., either upstream or downstream of the fuel injection surfaces 346, 348).

FIG. 30 illustrates the exemplary fuel injector body 340 having the plurality of mixing enhancing members 358 and a generally hexagonal shape, in which the leading edge 342 and the trailing edge 344 are generally parallel to one another. Two intermediate surfaces 347, 349 are located between the leading edge 342 and the fuel injection surfaces 346, 348, respectively. The fuel injection surfaces 346, 348 intersect with the trailing edge 344, and have the pair of mixing enhancing members 358 coupled to or formed thereon.

Referring to FIG. 31, the fuel injection body 340 has the plurality of mixing enhancing members 358 and a generally octagonal shape. Again, the leading edge 342 and the trailing edge 344 are substantially parallel to one another; the fuel injection surfaces 346, 348 intersect with the trailing edge 344, and have the pair of mixing enhancing members 358 coupled to or formed thereon; and the intermediate surfaces 347, 349, respectively, are located immediately upstream of the fuel injection surfaces 346, 348. In this exemplary embodiment, the second pair of intermediate surfaces 341, 343 are positioned between the first pair of intermediate surfaces 347, 349 and the leading edge 342.

FIG. 32 illustrates the fuel injection body 340 having a plurality of mixing enhancing members 358 and a generally trapezoidal shape with the leading edge 342 that is parallel to an oppositely disposed trailing edge 344. In this embodiment, the fuel injection surfaces 346, 348 are angled relative to the leading edge 342 and the trailing edge 344 and are generally parallel to the side walls 326 of the frame 304 of the fuel injector 100. In addition, the fuel injection body 340 has the pair of mixing enhancing members 358 coupled to, or formed on, the fuel injection surfaces 346, 348.

Figure 33:
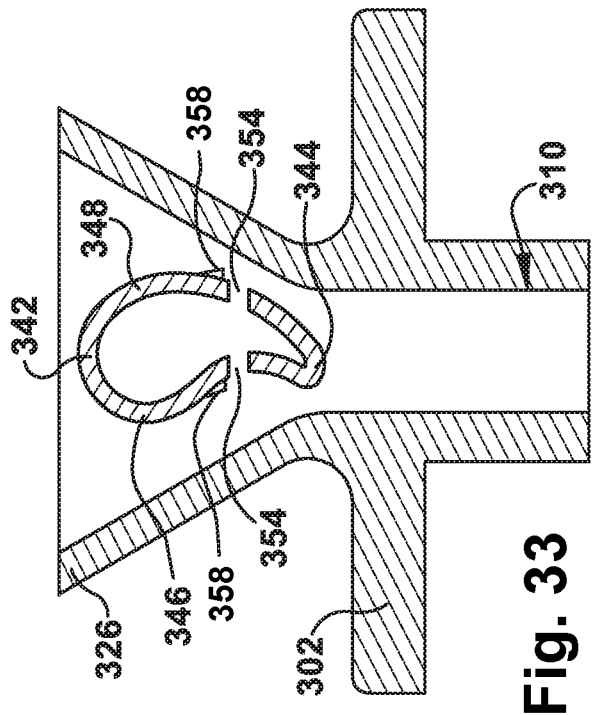
FIG. 33 is a cross-sectional view of an alternate embodiment of the fuel injector of FIG. 23, in which the fuel injection body is provided with an airfoil shape.

FIG. 33 illustrates yet another exemplary fuel injection body 340, in which the fuel injection body 340 is defined as having the plurality of mixing enhancing members 358 and an airfoil shape. The fuel injection body 340 includes the pressure side 346 and the suction side 348, either or both of which may function as the fuel injection surfaces. At the upstream portion of the fuel injector 100, the pressure side 346 and the suction side 348 intersect at the leading edge 342. The trailing edge 344 is opposite the leading edge 342, and is located upstream of the outlet member 310 of the fuel injector 100. In addition, the fuel injection body 340 has the pair of mixing enhancing members 358 coupled to, or formed on, the pressure side 346 and the suction side 348.

Figure 34:
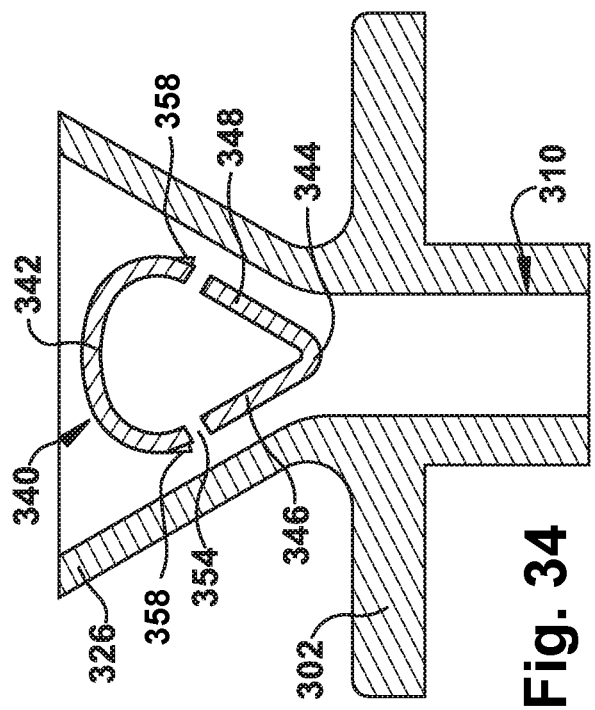
FIG. 34 is a cross-sectional view of an alternate embodiment of the fuel injector of FIG. 23, in which fuel injection holes on the fuel injection body are angled relative to the injection surfaces.

FIG. 34 illustrates an embodiment of the fuel injection body 340 of FIG. 23 having the plurality of mixing enhancing members 358, in which the fuel injection ports 354 are oriented at an angle (i.e., obliquely) with regard to the injection axis 312 (shown in FIG. 24). It should be appreciated that any angle may be employed for the fuel injection ports 354, as desired. In addition, the fuel injection body 340 has the pair of mixing enhancing members 358 coupled to, or formed on, the fuel injection surfaces 346, 348.

Figure 35:
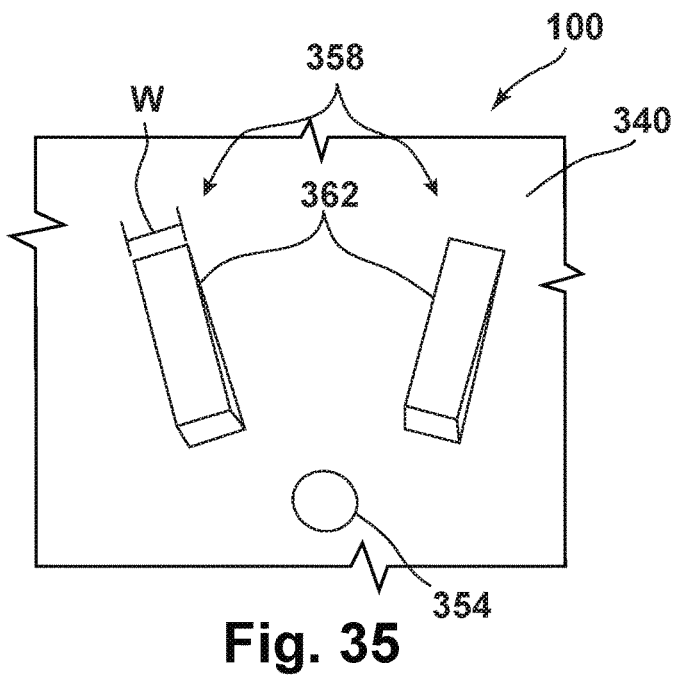
FIG. 35 is an enlarged perspective view of mixing enhancing members on the fuel injector shown in FIG. 23, in accordance with a first embodiment of the disclosure.
Figure 36:
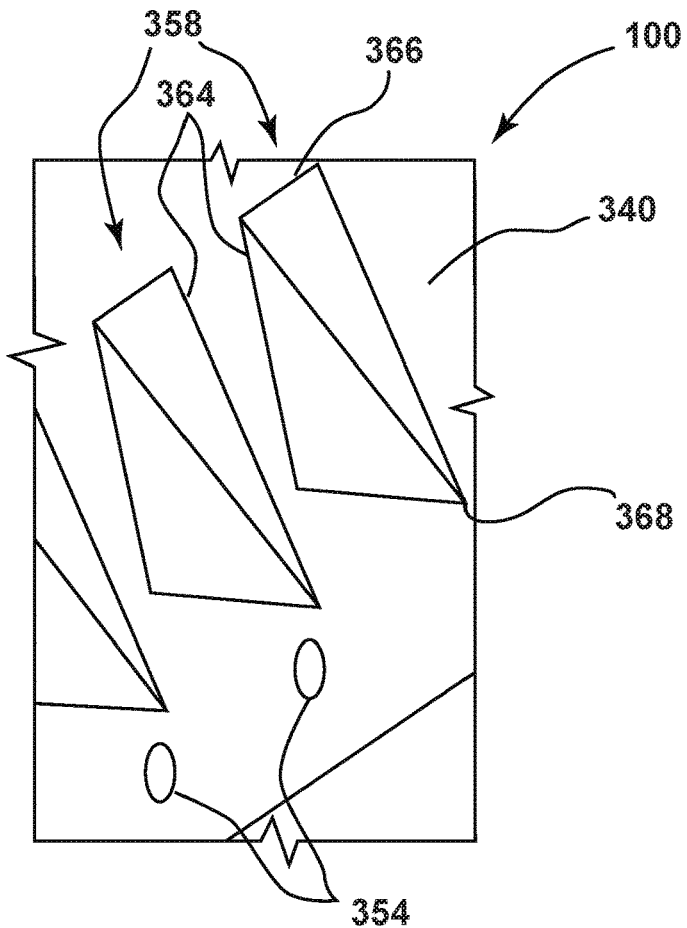
FIG. 36 is an enlarged perspective view of mixing enhancing members on the fuel injector shown in FIG. 23, in accordance with a second embodiment of the disclosure.
Figure 37:
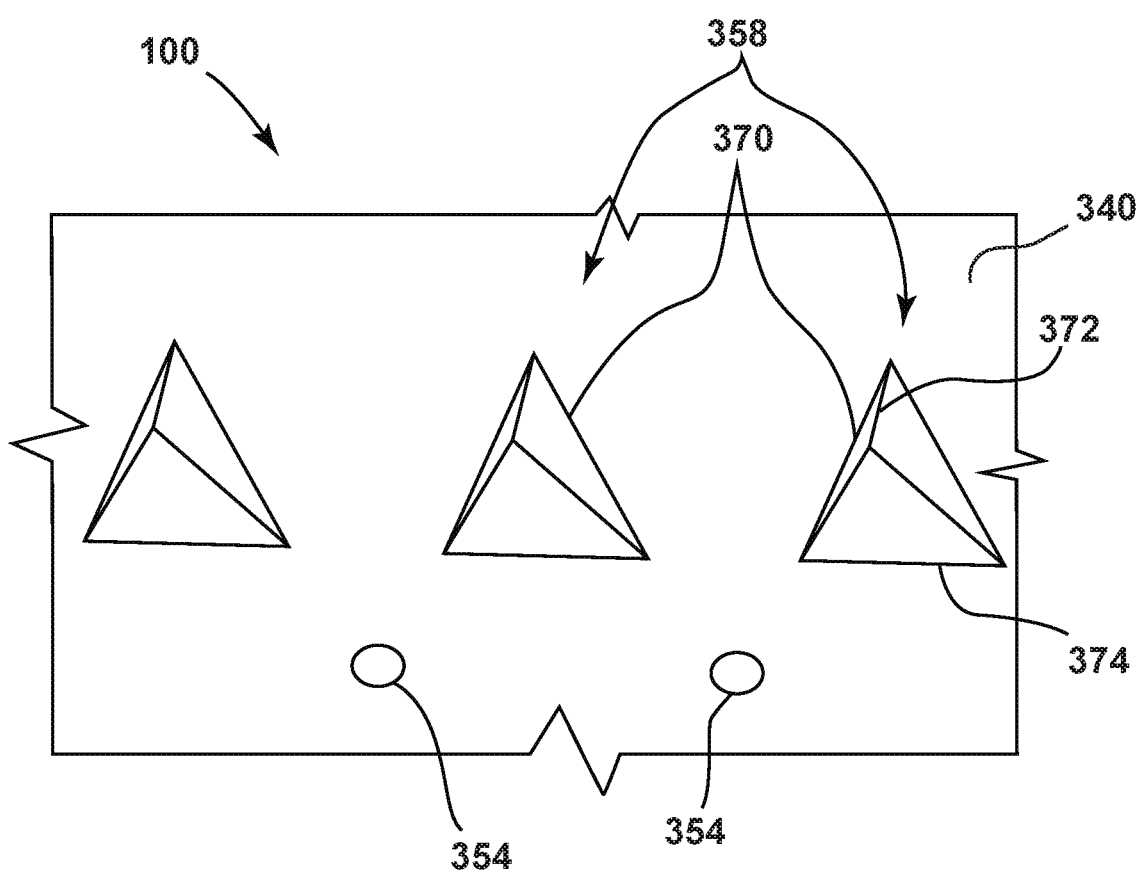
FIG. 37 is an enlarged perspective view of mixing enhancing members on the fuel injector shown in FIG. 23, in accordance with a third embodiment of the disclosure.

FIGS. 35-37 are enlarged perspective views of mixing enhancing members 358 on fuel injector 100, in accordance with different embodiments of the disclosure. In the exemplary embodiment, mixing enhancing members 358 are sized and shaped in any manner that enables fuel injector 100 to function as described herein. For example, as will be explained in further detail, mixing enhancing members 358 generally have an upstream end and a downstream end, and a non-uniform thickness extending between the upstream end and the downstream end such that one of the upstream end or the downstream end is flush with a surface of fuel injection body 340, and such that the other of the upstream end or the downstream end protrudes a distance from the surface of fuel injection body 340.

Referring to FIG. 35, fuel injector 100 includes first mixing enhancing members 362 formed thereon. First mixing enhancing members 362 have a triangular profile, and a substantially uniform width W. In an alternative embodiment, referring to FIG. 36, fuel injector 100 includes second mixing enhancing members 364 formed thereon. Second mixing enhancing members 364 have an upstream end 366 and a downstream end 368. In addition, second mixing enhancing members 364 have a triangular profile and, and the width thereof is progressively reduced from upstream end 366 towards downstream end 368. In a further alternative embodiment, referring to FIG. 37, fuel injector 100 includes third mixing enhancing members 370 formed thereon. Third mixing enhancing members 370 have an upstream end 372 and a downstream end 374. In addition, third mixing enhancing members 370 have a triangular profile and, and the width thereof is progressively increased from upstream end 372 towards downstream end 374.

The methods and systems described herein facilitate enhanced mixing of fuel and compressed gas in a combustor. More specifically, the methods and systems facilitate positioning a fuel injection body having a plurality of mixing enhancing members in the middle of a flow of compressed gas through a fuel injector, thereby enhancing the distribution of fuel throughout the compressed gas. Thus, the methods and systems facilitate enhanced mixing of fuel and compressed gas in a fuel injector of an AFS system in a turbine assembly. The methods and systems therefore facilitate improving the overall operating efficiency of a combustor such as, for example, a combustor in a turbine assembly. This increases the output and reduces the cost associated with operating a combustor such as, for example, a combustor in a turbine assembly.

Exemplary embodiments of fuel injectors and methods of fabricating the same are described above in detail. The methods and systems described herein are not limited to the specific embodiments described herein, but rather, components of the methods and systems may be utilized independently and separately from other components described herein. For example, the methods and systems described herein may have other applications not limited to practice with turbine assemblies, as described herein. Rather, the methods and systems described herein can be implemented and utilized in connection with various other industries.

While the invention has been described in terms of various specific embodiments, those skilled in the art will recognize that the invention can be practiced with modification within the spirit and scope of the claims.

What is claimed is:

1. A fuel injector comprising:
   a frame having interior sides defining an opening for passage of a first fluid;
   a fuel injection body coupled to the frame and being positioned within the opening, such that flow paths for the first fluid are defined between the interior sides of the frame and the fuel injection body, wherein the fuel injection body defines a fuel plenum, and comprises a leading edge, a trailing edge, and a plurality of fuel injection holes defined between the leading and trailing edges, the plurality of fuel injection holes in communication with the fuel plenum along at least one outer surface of the fuel injection body, wherein the fuel injection body comprises an upstream portion between the leading edge and the plurality of fuel injection holes, and a downstream portion between the trailing edge and the plurality of fuel injection holes;
   at least one mixing enhancing member coupled to the upstream portion of the fuel injection body, wherein the at least one mixing enhancing member is positioned between the plurality of fuel injection holes and the leading edge;
   a conduit fitting coupled to the frame and fluidly connected to the fuel plenum;
   a mounting flange, wherein the frame extends radially outward from the mounting flange; and
   wherein the frame is configured to have a generally rectangular profile with walls, such that the conduit fitting is formed integrally with only one of the walls to provide fuel to the fuel plenum of the fuel injection body.

2. The fuel injector of claim 1, wherein the at least one mixing enhancing member is oriented obliquely relative to an injection axis.

3. The fuel injector of claim 1, wherein the at least one mixing enhancing member has an upstream end and a downstream end, the at least one mixing enhancing member having a non-uniform thickness extending between the upstream end and the downstream end.

4. The fuel injector of claim 3, wherein one of the upstream end and the downstream end is flush with a surface of the fuel injection body, and the other of the upstream end and the downstream end protrudes a distance from the surface of the fuel injection body.

5. The fuel injector of claim 1, wherein the at least one mixing enhancing member comprises a pair of mixing enhancing members positioned upstream from each of the plurality of fuel injection holes.

6. The fuel injector of claim 1, wherein the fuel injection body has a cross-sectional shape defining one of a teardrop shape, an airfoil shape, a triangular shape, a square shape, a pentagonal shape, a hexagonal shape, an octagonal shape, a diamond shape, and a trapezoidal shape.

7. The fuel injector of claim 6, wherein a cross-section of the fuel injection body defines a teardrop shape, the teardrop shape having the leading edge of the fuel injection body, a trailing edge opposite the leading edge, and a pair of outer surfaces between the leading edge and the trailing edge, at least one of the pair of outer surfaces being the at least one outer surface defining the plurality of fuel injection holes.

8. The fuel injector of claim 1, wherein one or more of the plurality of fuel injection holes is normal to the at least one outer surface of the fuel injection body.

9. The fuel injector of claim 1, wherein one or more of the plurality of fuel injection holes is angled relative to at least one outer surface of the fuel injection body.

10. The fuel injector of claim 1, wherein the fuel injection body is positioned radially outward of the mounting flange.

11. A combustor for a gas turbine, the combustor comprising:
    a liner defining a combustion chamber, the liner defining a head end, an aft end, and at least one opening therethrough between the head end and the aft end; and
    an axial fuel staging (AFS) system comprising:
       a fuel injector, the fuel injector being mounted to provide fluid communication through a respective one of the at least one opening in the liner, the fluid communication being directed in a radial direction with respect to a longitudinal axis of the liner; and
       a fuel supply line coupled to the fuel injector;
    wherein the fuel injector further comprises:
       a frame having interior sides defining an opening for passage of a first fluid;
       a fuel injection body coupled to the frame and being positioned within the opening such that flow paths for the first fluid are defined between the interior sides of the frame and the fuel injection body; wherein the fuel injection body defines a fuel plenum, and has a leading edge, an opposite trailing edge, and a plurality of fuel injection holes defined between the leading and trailing edges, the plurality of fuel injection holes in communication with the fuel plenum along at least one outer surface of the fuel injection body, wherein the fuel injection body comprises an upstream portion between the leading edge and the plurality of fuel injection holes, and a downstream portion between the trailing edge and the plurality of fuel injection holes;
       at least one mixing enhancing member coupled to the upstream portion of the fuel injection body, wherein the at least one mixing enhancing member is positioned between the plurality of fuel injection holes and the leading edge;
       a conduit fitting integral with the frame and fluidly connected between the fuel supply line and the fuel plenum;
       an outlet member, the outlet member being in fluid communication with the flow paths; and
       a mounting flange, wherein the frame extends radially outward from the mounting flange, and
       wherein the frame is configured to have a generally rectangular profile with walls, such that the conduit fitting is formed integrally with only one of the walls to provide fuel to the fuel plenum of the fuel injection body.

12. The combustor of claim 11, wherein the at least one mixing enhancing member is angled relative to an injection axis.

13. The combustor of claim 11, wherein the at least one mixing enhancing member has an upstream end and a downstream end, the at least one mixing enhancing member having a non-uniform thickness extending between the upstream end and the downstream end.

14. The combustor of claim 13, wherein one of the upstream end and the downstream end is flush with a surface of the fuel injection body, and the other of the upstream end and the downstream end protrudes a distance from the surface of the fuel injection body.

15. The combustor of claim 11, wherein the at least one mixing enhancing member comprises a pair of mixing enhancing members positioned upstream from each of the plurality of fuel injection holes.

16. The combustor of claim 11, wherein the fuel injection body has a cross-section defining one of a teardrop shape, an airfoil shape, a triangular shape, a square shape, a pentagonal shape, a hexagonal shape, an octagonal shape, a diamond shape, and a trapezoidal shape.

17. The fuel injector of claim 16, wherein the cross-section of the fuel injection body defines a teardrop shape, the teardrop shape having the leading edge of the fuel injection body, a trailing edge opposite the leading edge, and a pair of outer surfaces between the leading edge and the trailing edge, at least one of the pair of outer surfaces being the at least one outer surface defining the plurality of fuel injection holes.

18. The combustor of claim 11, wherein one or more of the plurality of fuel injection holes of the fuel injection body is normal to the at least one outer surface of the fuel injection body.

19. The combustor of claim 11, wherein one or more of the plurality of fuel injection holes of the fuel injection body is angled relative to at least one outer surface of the fuel injection body.

20. The combustor of claim 11, wherein the fuel injection body is positioned radially outward of the mounting flange.

* * * * *